US012711129B2

(12) United States Patent
Prasad et al.

(10) Patent No.: US 12,711,129 B2
(45) Date of Patent: Aug. 18, 2026

(54) METHODS, APPARATUSES AND COMPUTER PROGRAM PRODUCTS FOR IMPROVING DATA RETRIEVAL RELEVANCE AND REDUCING DATA RETRIEVAL LATENCY IN CLOUD-BASED PLATFORMS

(71) Applicant: ATLASSIAN PTY, LTD, Sydney (AU)

(72) Inventors: Akshar Prasad, Bengaluru (IN); Shashank Prasad Rao, Noida (IN)

(73) Assignee: ATLASSIAN PTY, LTD, Sydney (AU)

( * ) Notice: Subject to any disclaimer, the term of this patent is extended or adjusted under 35 U.S.C. 154(b) by 0 days.

(21) Appl. No.: 19/001,227

(22) Filed: Dec. 24, 2024

(65) Prior Publication Data

US 2026/0178570 A1 Jun. 25, 2026

(51) Int. Cl.
*G06F 16/242* (2019.01)
*G06F 16/2457* (2019.01)
*G06F 16/248* (2019.01)

(52) U.S. Cl.
CPC ...... *G06F 16/243* (2019.01); *G06F 16/24578* (2019.01); *G06F 16/248* (2019.01)

(58) Field of Classification Search
CPC . G06F 16/243; G06F 16/24578; G06F 16/248
See application file for complete search history.

(56) References Cited

U.S. PATENT DOCUMENTS 7,636,714 B1 * 12/2009 Lamping ............. G06F 16/3322 707/999.005
8,601,028 B2 * 12/2013 Liao .................... H04L 63/0815 707/791
8,732,174 B2 * 5/2014 Deubel ................... G06F 16/81 707/711
9,317,585 B2 * 4/2016 Heymans ............ G06F 16/3322
9,471,668 B1 * 10/2016 Alupului ............. G06F 16/3329
9,817,891 B1 * 11/2017 Eksteen .............. G06F 16/2425
10,764,254 B2 * 9/2020 Ford ...................... H04W 12/02
11,663,201 B2 * 5/2023 Alakuijala ............... G06N 3/09 706/12
2012/0096000 A1 * 4/2012 Azar ................... G06F 16/9535 707/732

(Continued)

OTHER PUBLICATIONS

Weston, Jason et al., System 2 Attention (Is Something You Might Need Too), Nov. 20, 2023, https://arxiv.org/pdf/2311.11829, Apr. 3, 2025.

*Primary Examiner* — Jorge A Casanova
(74) *Attorney, Agent, or Firm* — Alston & Bird LLP

(57) ABSTRACT

Various examples herein described are related to methods, apparatuses, and computer program products for improving data retrieval relevance and reducing data retrieval latency in cloud-based issue and page platforms are provided. For example, an example computer-implemented method may comprise receiving query content metadata through a query input user interface; generating one or more query variant data objects; retrieving one or more relevant page data objects from a plurality of page data objects; generating one or more answer data objects; and rendering the one or more answer data objects on an answer output user interface.

17 Claims, 13 Drawing Sheets

(56) References Cited

U.S. PATENT DOCUMENTS

2021/0352074 A1* 11/2021 Viswanath ............ H04L 63/101
2024/0126795 A1* 4/2024 Zhong ..................... H04L 51/02
2024/0362093 A1* 10/2024 Zhou ..................... G06F 16/243

* cited by examiner

Figure 7:
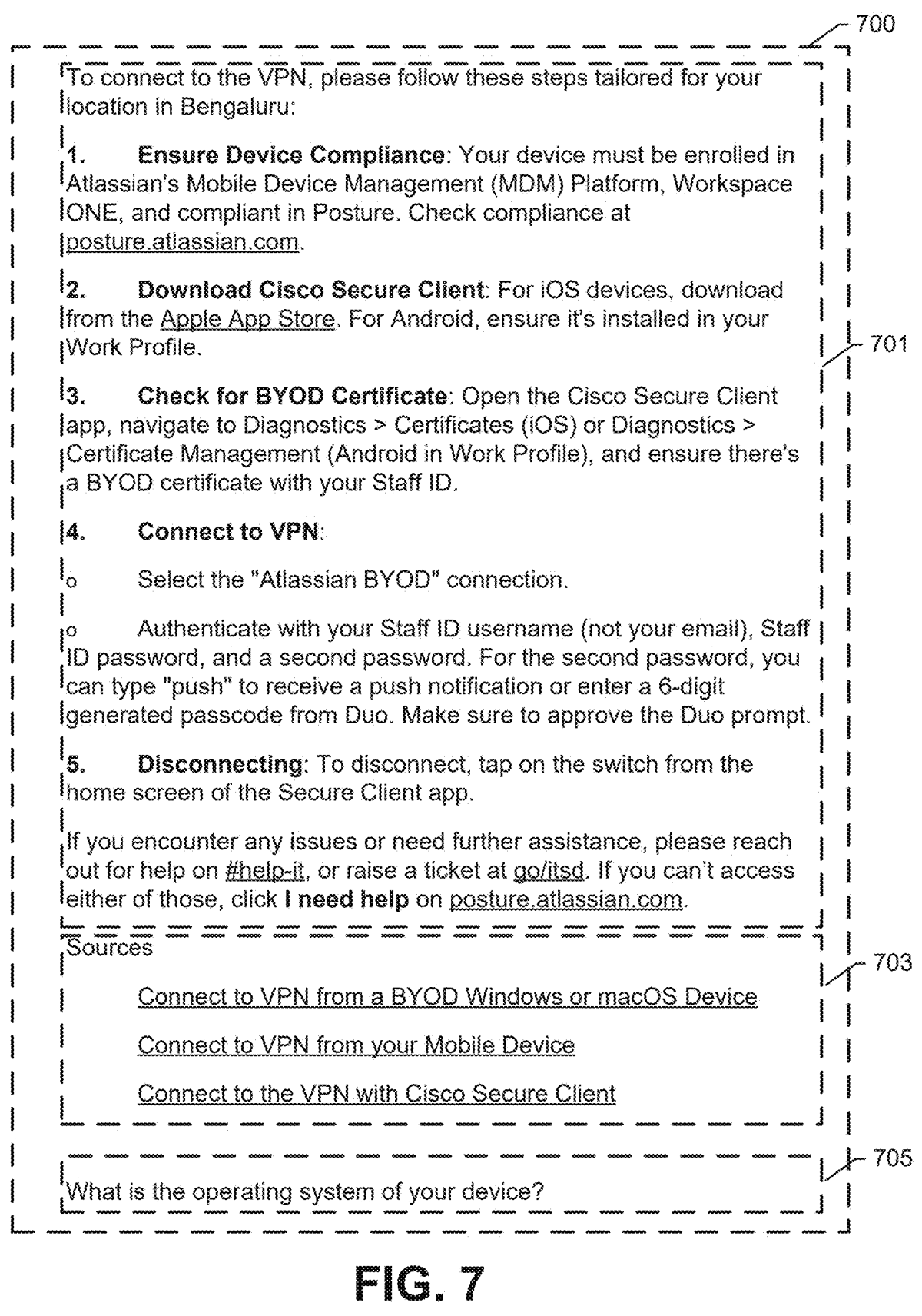

700

To connect to the VPN, please follow these steps tailored for your location in Bengaluru:

1. Ensure Device Compliance: Your device must be enrolled in Atlassian's Mobile Device Management (MDM) Platform, Workspace ONE, and compliant in Posture. Check compliance at posture.atlassian.com.

2. Download Cisco Secure Client: For iOS devices, download from the Apple App Store. For Android, ensure it's installed in your Work Profile.

3. Check for BYOD Certificate: Open the Cisco Secure Client app, navigate to Diagnostics > Certificates (iOS) or Diagnostics > Certificate Management (Android in Work Profile), and ensure there's a BYOD certificate with your Staff ID.

4. Connect to VPN:

o Select the "Atlassian BYOD" connection.

o Authenticate with your Staff ID username (not your email), Staff ID password, and a second password. For the second password, you can type "push" to receive a push notification or enter a 6-digit generated passcode from Duo. Make sure to approve the Duo prompt.

5. Disconnecting: To disconnect, tap on the switch from the home screen of the Secure Client app.

If you encounter any issues or need further assistance, please reach out for help on #help-it, or raise a ticket at go/itsd. If you can't access either of those, click I need help on posture.atlassian.com.

701

Sources

Connect to VPN from a BYOD Windows or macOS Device

Connect to VPN from your Mobile Device

Connect to the VPN with Cisco Secure Client

703

What is the operating system of your device?

METHODS, APPARATUSES AND COMPUTER PROGRAM PRODUCTS FOR IMPROVING DATA RETRIEVAL RELEVANCE AND REDUCING DATA RETRIEVAL LATENCY IN CLOUD-BASED PLATFORMS

BACKGROUND

Applicant has identified many technical deficiencies and problems associated with data retrieval in complex network computer systems.

BRIEF SUMMARY

In general, embodiments of the present disclosure provide methods, apparatuses, systems, computing devices, and/or the like for complex network computer systems such as cloud-based issue and page platforms.

In accordance with various embodiments of the present disclosure, an apparatus is provided. In some embodiments, the apparatus comprises at least one processor and at least one non-transitory memory that comprises program code. In some embodiments, the at least one non-transitory memory and the program code are configured to, with the at least one processor, cause the apparatus to at least receive query content metadata through a query input user interface; generate one or more query variant data objects by inputting the query content metadata to a query variant formulation layer of a page-based query answering machine learning model; retrieve one or more relevant page data objects from a plurality of page data objects by inputting the one or more query variant data objects to a query result formulation layer of the page-based query answering machine learning model; generate one or more answer data objects by inputting the one or more relevant page data objects to a query answer formulation layer of the page-based query answering machine learning model; and render the one or more answer data objects on an answer output user interface.

In some embodiments, the query variant formulation layer and the query answer formulation layer of the page-based query answering machine learning model comprise one or more generative pre-trained transformers.

In some embodiments, the one or more query variant data objects comprise at least one keyword-based query variant data object. In some embodiments, the at least one keyword-based query variant data object comprises extracted keyword metadata based on the query content metadata.

In some embodiments, the one or more query variant data objects comprise at least one synonym-based query variant data object. In some embodiments, the at least one synonym-based query variant data object comprises predicted synonym metadata based on the query content metadata.

In some embodiments, the one or more query variant data objects comprise at least one location-based query variant data object. In some embodiments, the at least one location-based query variant data object comprises predicted location metadata based on a user data object associated with the query content metadata.

In some embodiments, the one or more query variant data objects comprise one or more query variant data objects. In some embodiments, the at least one non-transitory memory and the program code are configured to, with the at least one processor, cause the apparatus to transmit the one or more query variant data objects in parallel to a page data object retrieval application programming interface (API); receive relevant page data object identifying metadata associated with the one or more relevant page data objects from the page data object retrieval API; and retrieve the one or more relevant page data objects from one or more page data object repositories based at least in part on the relevant page data object identifying metadata.

In some embodiments, the query result formulation layer of the page-based query answering machine learning model comprises a plurality of encoders.

In some embodiments, the at least one non-transitory memory and the program code are configured to, with the at least one processor, cause the apparatus to: generate relevant page data object ranking metadata by inputting the one or more relevant page data objects to the plurality of encoders of the query result formulation layer; and generate the one or more answer data objects by inputting the relevant page data object ranking metadata and the one or more relevant page data objects to the query answer formulation layer.

In accordance with various embodiments of the present disclosure, a computer-implemented method is provided. In some embodiments, the computer-implemented method comprises: receiving query content metadata through a query input user interface of a cloud-based issue and page platform; generating one or more query variant data objects by inputting the query content metadata to a query variant formulation layer of a page-based query answering machine learning model; retrieving one or more relevant page data objects from a plurality of page data objects by inputting the one or more query variant data objects to a query result formulation layer of the page-based query answering machine learning model; generating one or more answer data objects by inputting the one or more relevant page data objects to a query answer formulation layer of the page-based query answering machine learning model; and rendering the one or more answer data objects on an answer output user interface of the cloud-based issue and page platform.

In accordance with various embodiments of the present disclosure, a computer program product is provided. In some embodiments, the computer program product comprises at least one non-transitory computer-readable storage medium having computer-readable program code portions stored therein. In some embodiments, the computer-readable program code portions comprise an executable portion configured to: receive query content metadata through a query input user interface of a cloud-based issue and page platform; generate one or more query variant data objects by inputting the query content metadata to a query variant formulation layer of a page-based query answering machine learning model; retrieve one or more relevant page data objects from a plurality of page data objects stored in a page data object system of the cloud-based issue and page platform by inputting the one or more query variant data objects to a query result formulation layer of the page-based query answering machine learning model; generate one or more answer data objects by inputting the one or more relevant page data objects to a query answer formulation layer of the page-based query answering machine learning model; and render the one or more answer data objects on an answer output user interface of the cloud-based issue and page platform.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

Having thus described some embodiments in general terms, references will now be made to the accompanying drawings, which are not necessarily drawn to scale.

Figure 1:
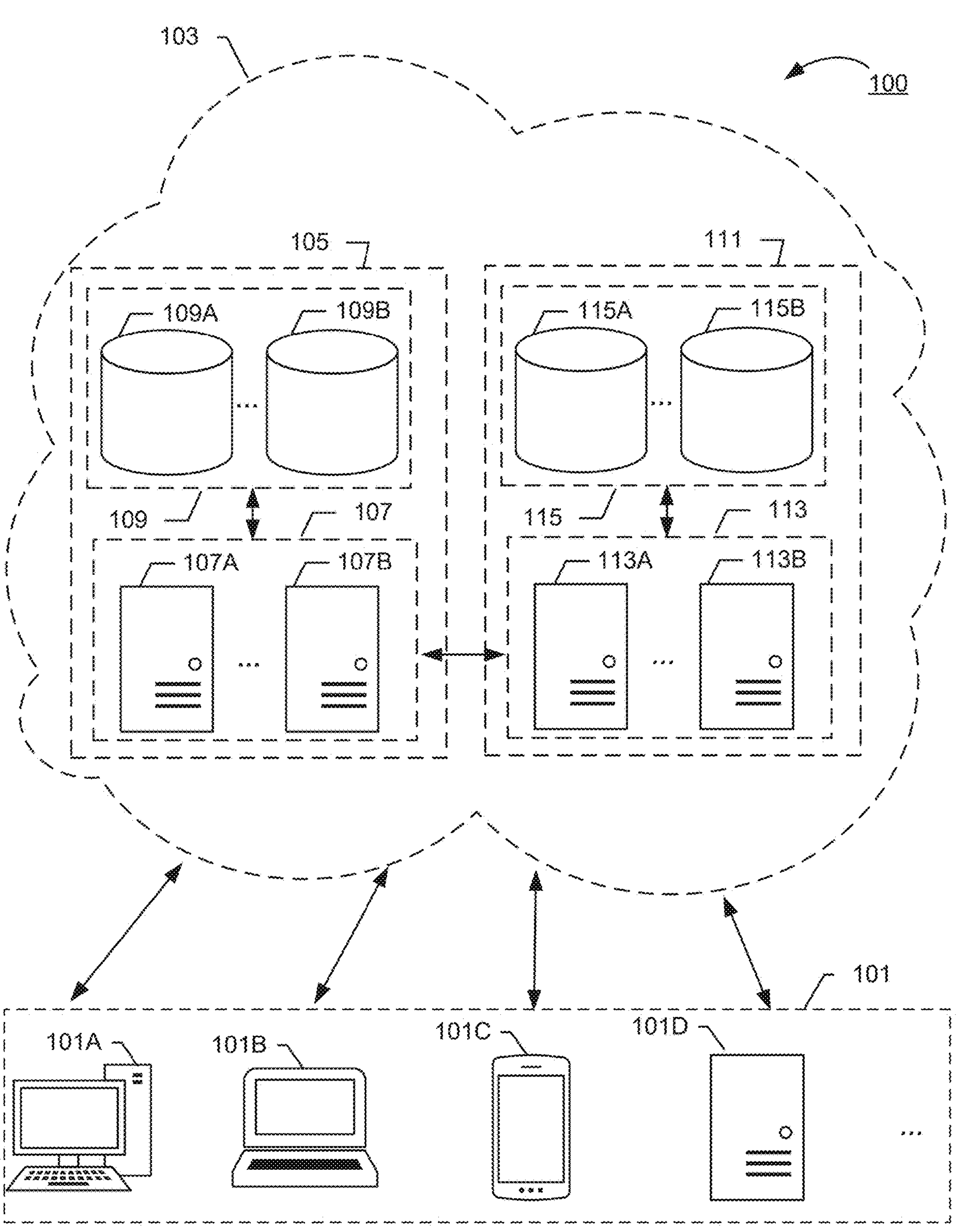

FIG. 1 is an example system architecture diagram illustrating an example cloud-based issue and page platform in communication with other devices (such as client computing devices) in accordance with some embodiments of the present disclosure.

Figure 2:
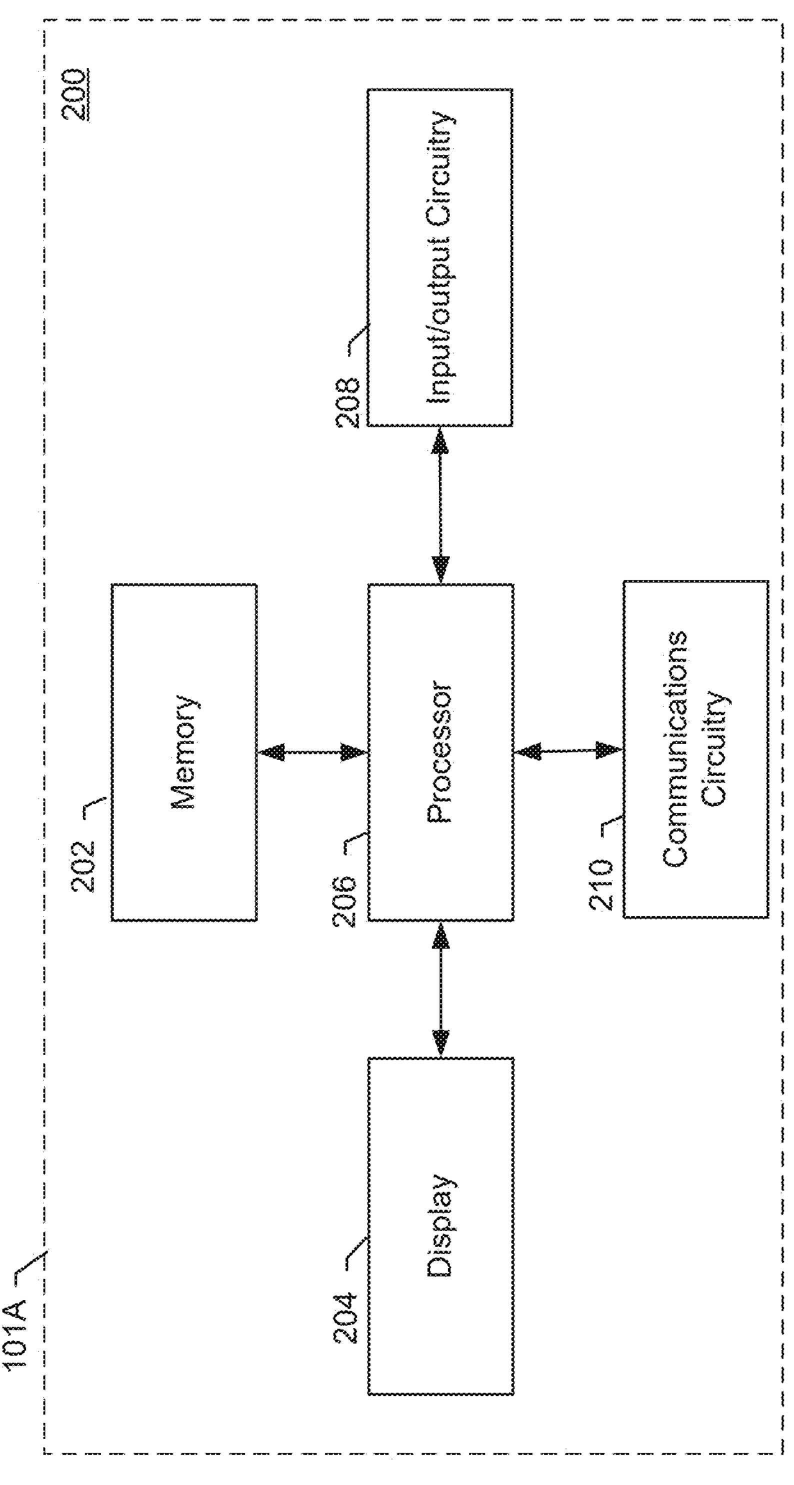

FIG. 2 is an example block diagram illustrating example components of an example apparatus in accordance with some embodiments of the present disclosure.

Figure 3:
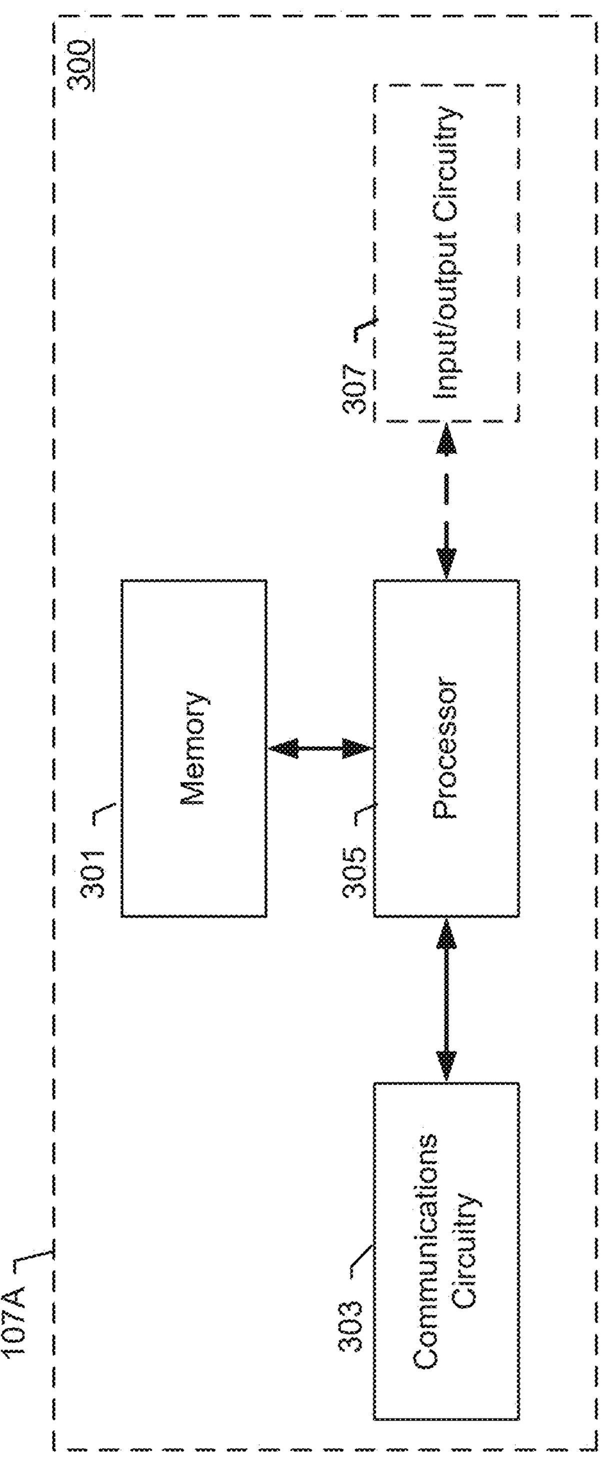

FIG. 3 is an example block diagram illustrating example components of an example apparatus in accordance with some embodiments of the present disclosure.

Figure 4:
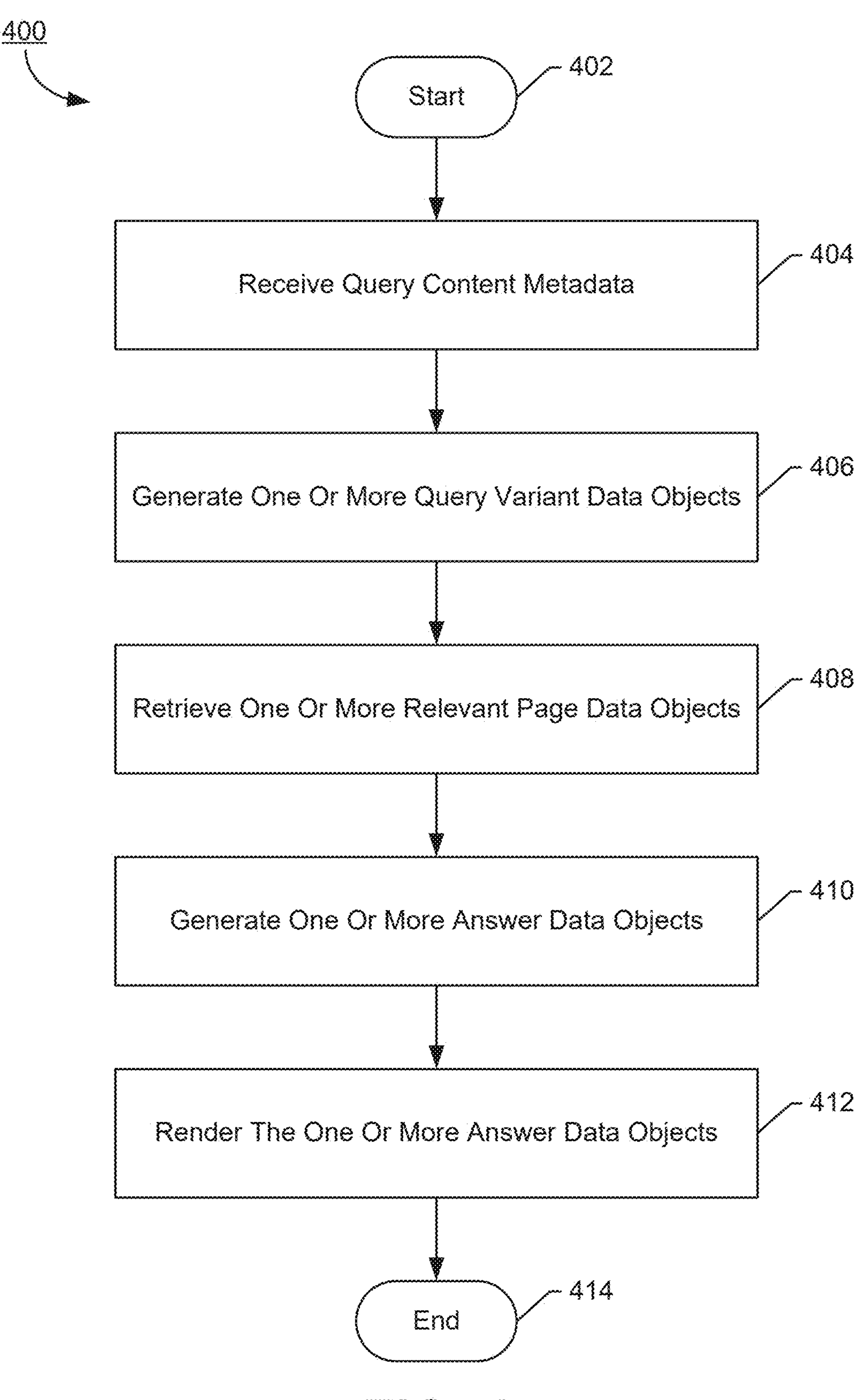

FIG. 4 is an example flow diagram illustrating example methods associated with generating and rendering example answer data objects in accordance with some embodiments of the present disclosure.

Figure 5:
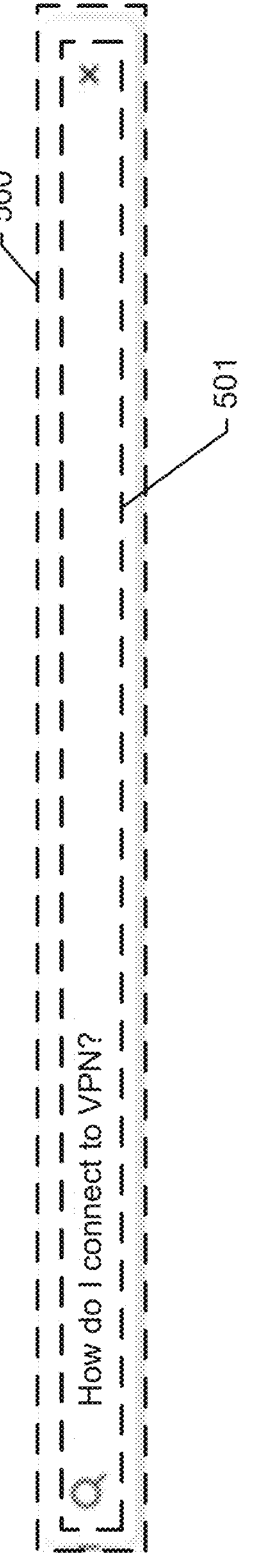

FIG. 5 is an example visualization view illustrating an example query input user interface of a cloud-based issue and page platform in accordance with some embodiments of the present disclosure.

Figure 6:
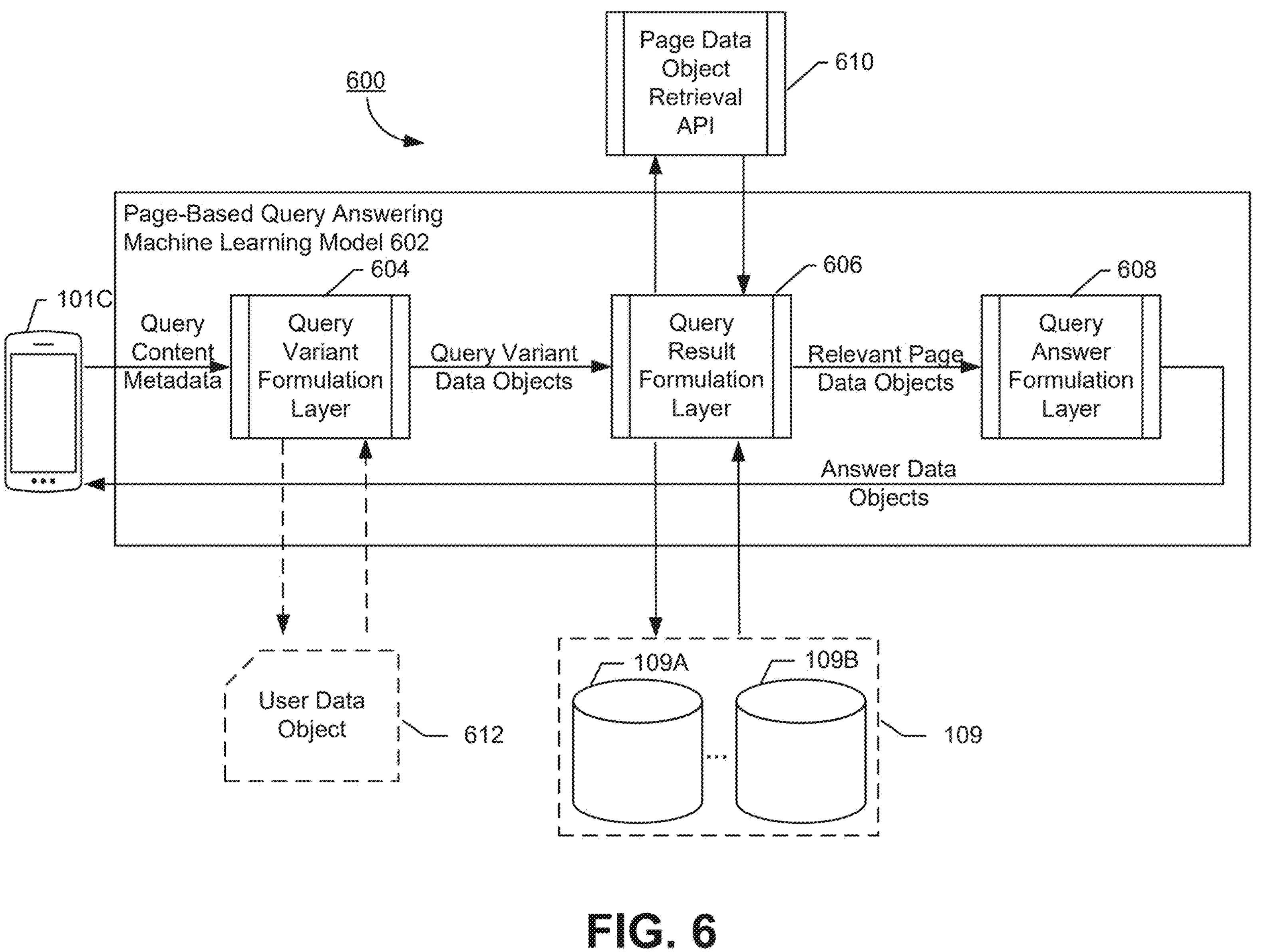

FIG. 6 is an example block diagram illustrating example operations associated with an example page-based query answering machine learning model in accordance with some embodiments of the present disclosure.

FIG. 7 is an example visualization view illustrating an example answer output user interface of a cloud-based issue and page platform in accordance with some embodiments of the present disclosure.

Figure 8:
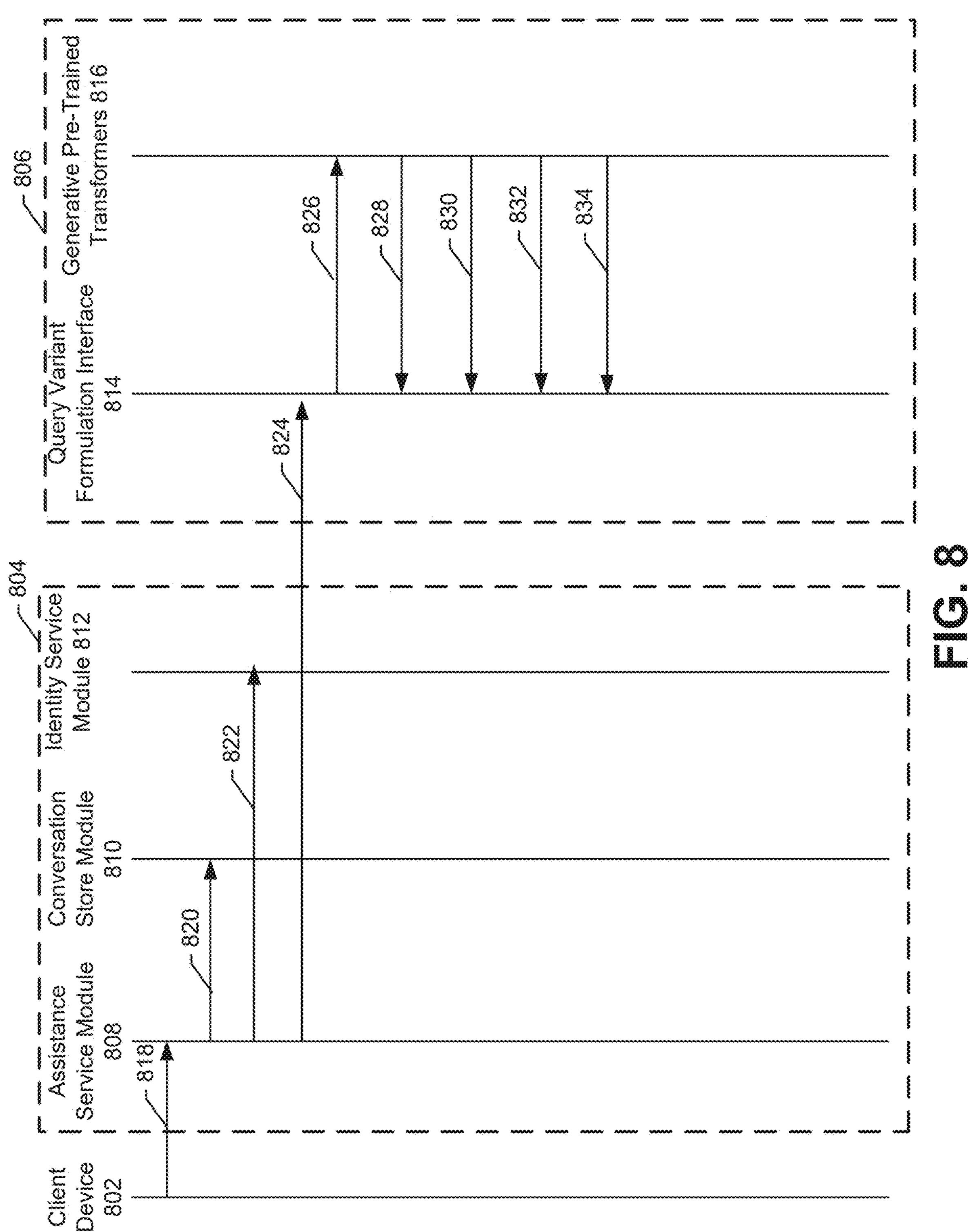

FIG. 8 is an example sequence diagram illustrating example operations associated with an example query variant formulation layer of an example page-based query answering machine learning model in accordance with some embodiments of the present disclosure.

Figure 9:
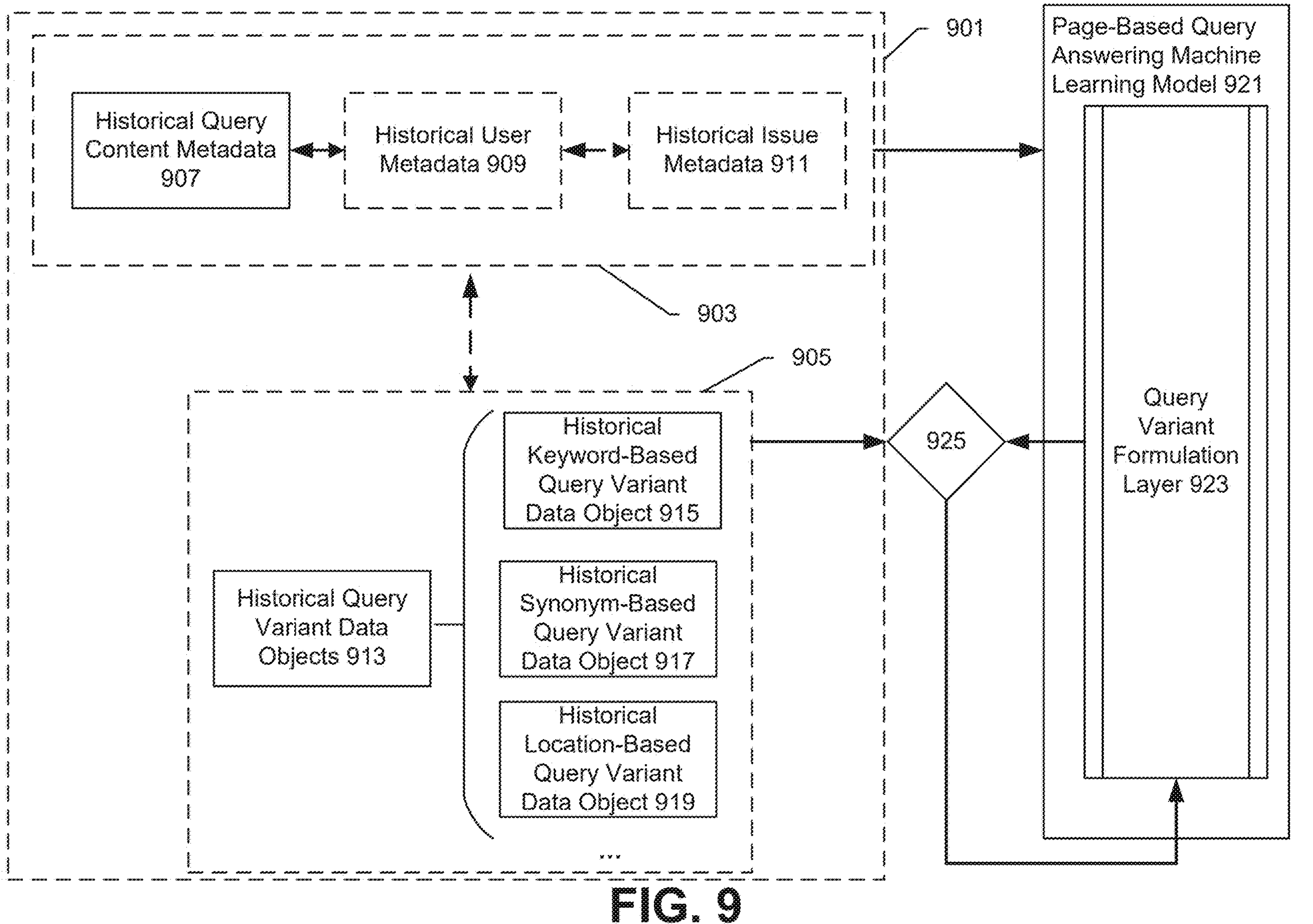

FIG. 9 is an example block diagram illustrating example training of an example query variant formulation layer of an example page-based query answering machine learning model in accordance with some embodiments of the present disclosure.

Figure 10:
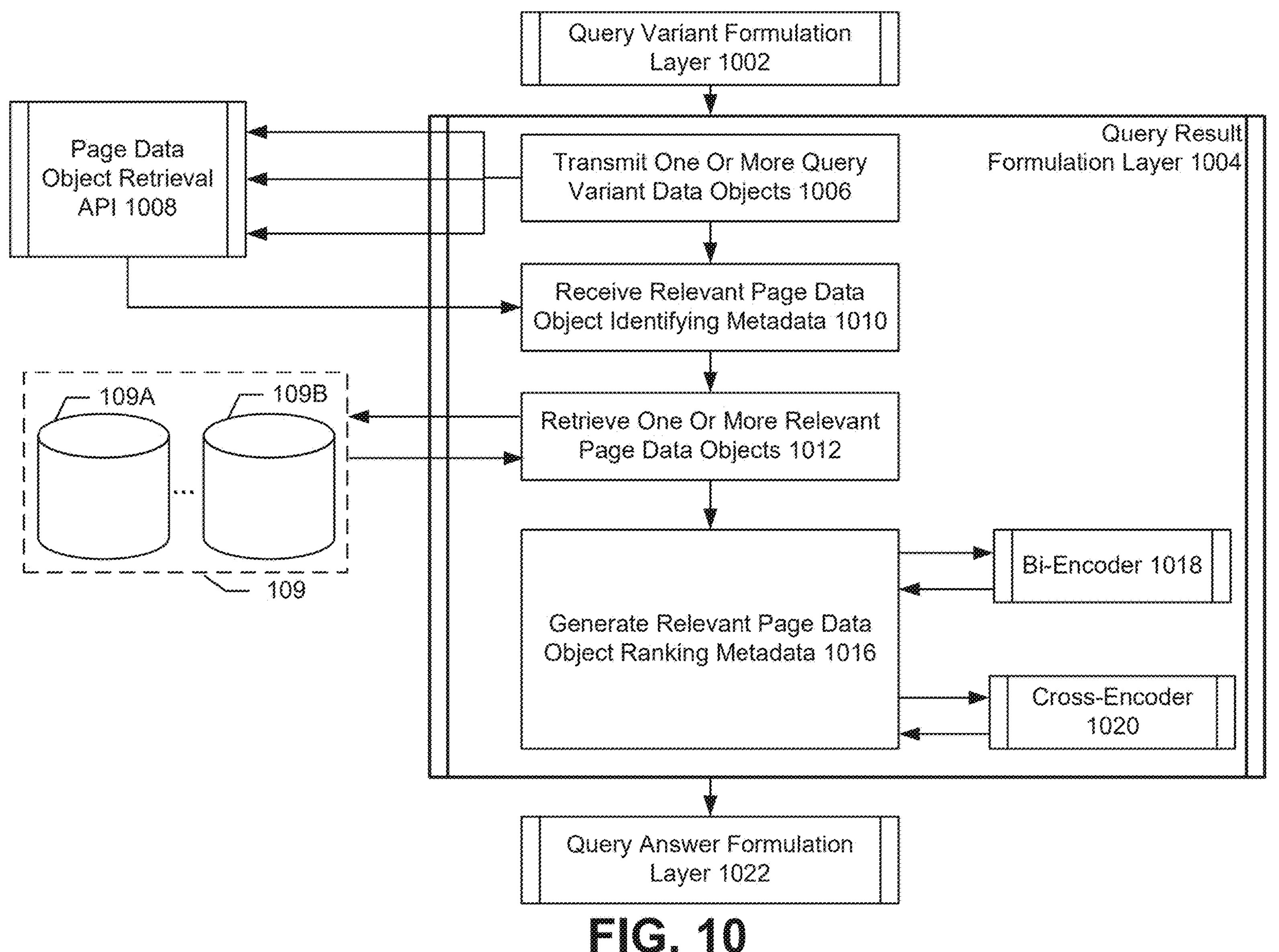

FIG. 10 is an example block diagram illustrating example operations associated with an example query result formulation layer of an example page-based query answering machine learning model in accordance with some embodiments of the present disclosure.

Figure 11:
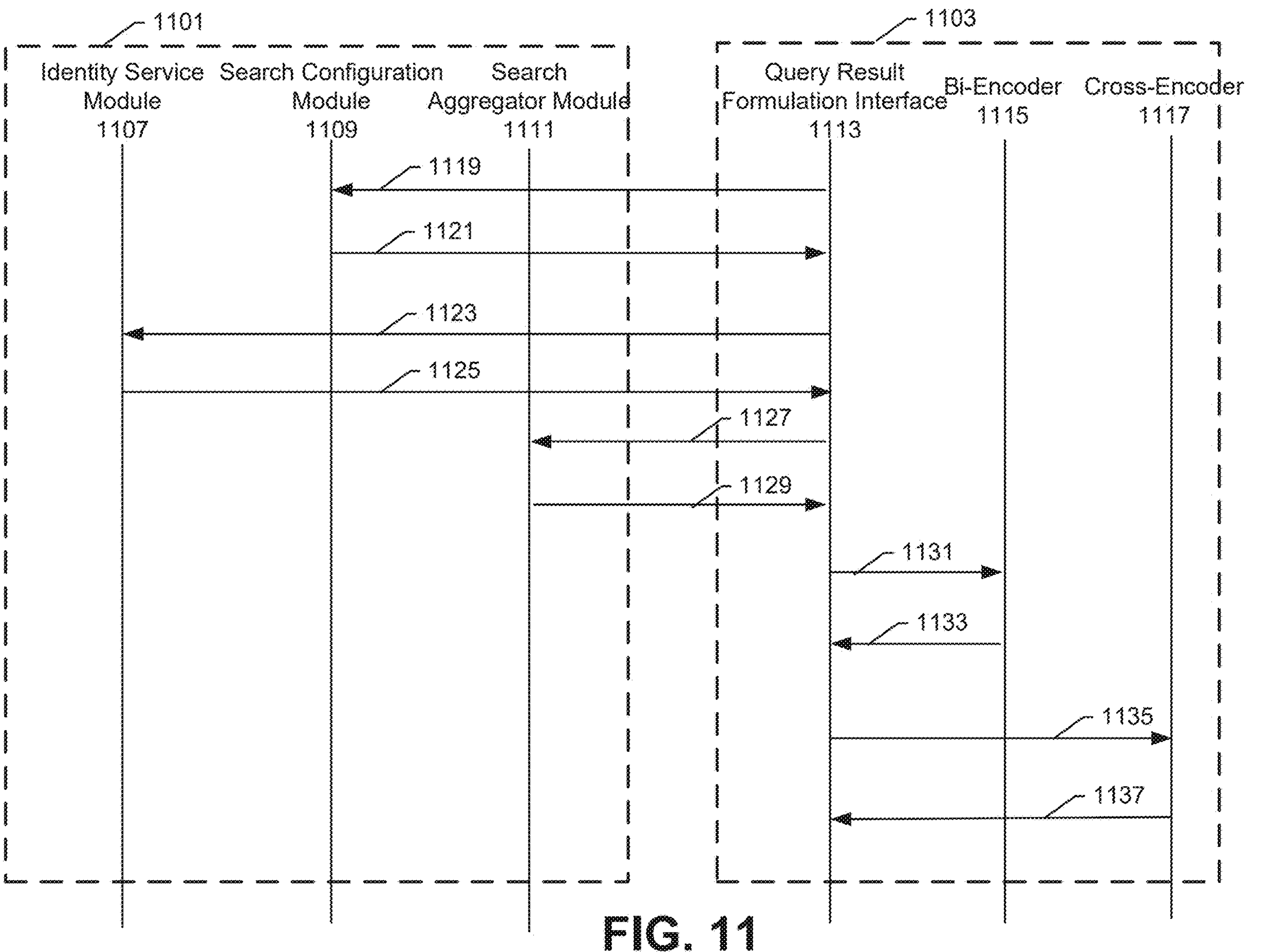

FIG. 11 is an example sequence diagram illustrating example operations associated with an example query result formulation layer of an example page-based query answering machine learning model in accordance with some embodiments of the present disclosure.

Figure 12:
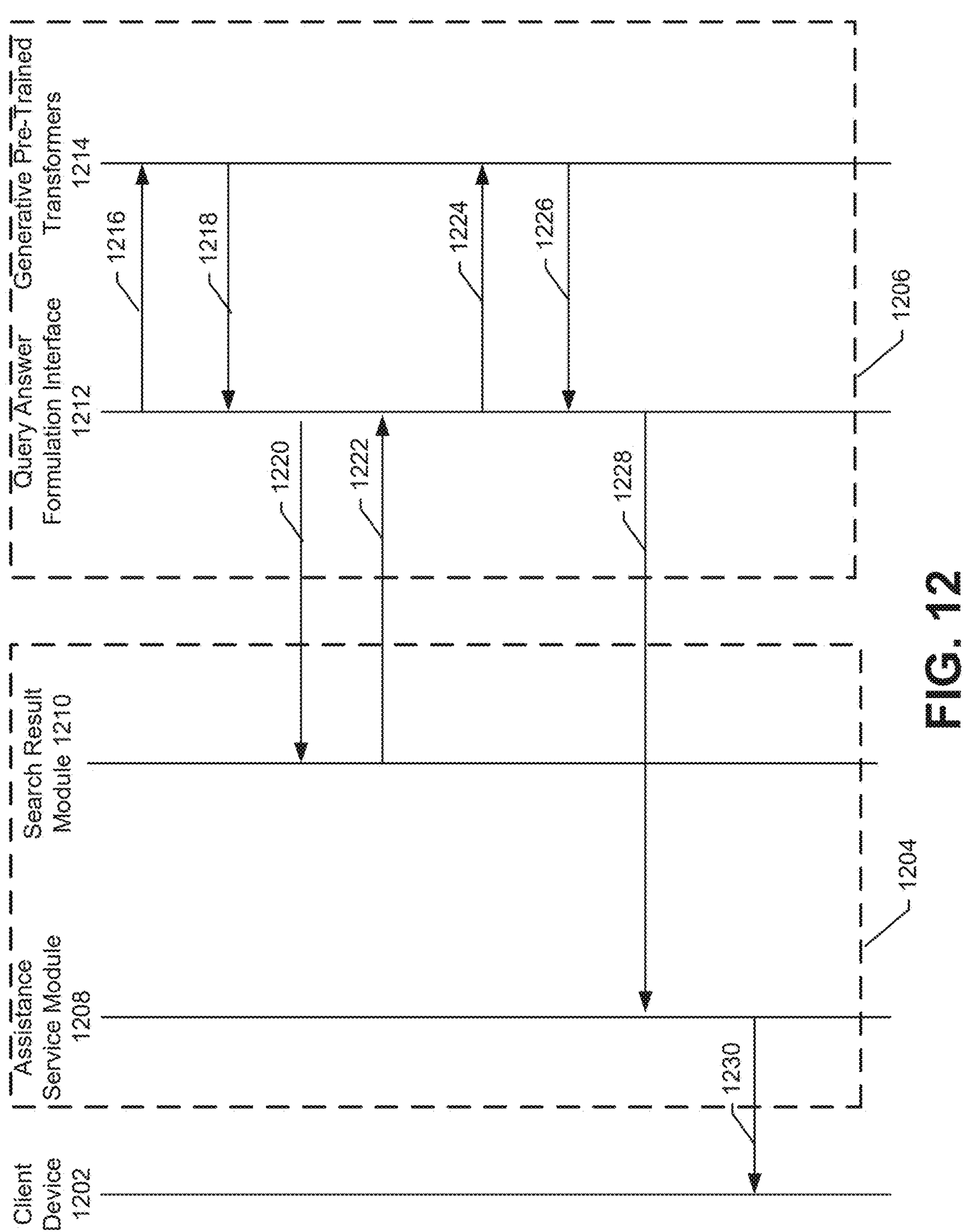

FIG. 12 is an example sequence diagram illustrating example operations associated with an example query answer formulation layer of an example page-based query answering machine learning model in accordance with some embodiments of the present disclosure.

Figure 13:
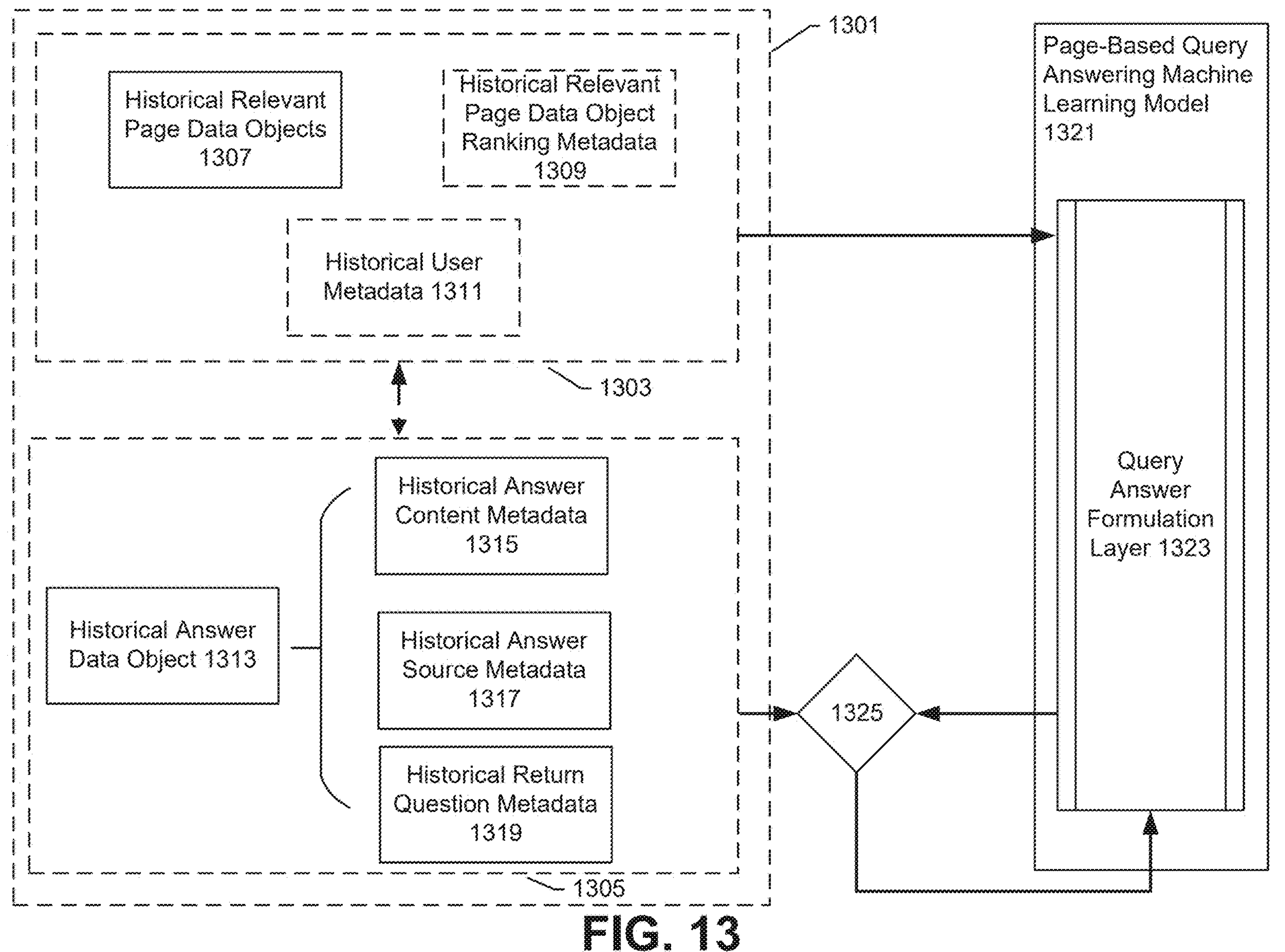

FIG. 13 is an example block diagram illustrating example training of an example query answer formulation layer of an example page-based query answering machine learning model in accordance with some embodiments of the present disclosure.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," "in some examples," "for example," and the like generally mean that the particular feature, structure, or characteristic following the phrase may be included in an embodiment of the present disclosure, and may be included in more than one embodiment of the present disclosure (importantly, such phrases do not necessarily refer to the same embodiment).

Overview

Various embodiments of the present disclosure relate generally to methods, apparatuses, systems, computing devices, and/or the like for improving data retrieval relevance and reducing data retrieval latency in complex network systems such as cloud-based computing platforms.

In the present disclosure, a "cloud-based computing platform" refers to network infrastructure that operates through cloud computing by distributing computing tasks (such as data communications, data storage, and/or data processing) across multiple computing entities (such as servers, processors, data repositories, and/or the like).

Cloud-based computing platforms may be implemented in various use cases. For example, a cloud-based computing platform may be implemented in a company or organization to allow members to track tasks, share documents, and/or perform other collaborative functions. Compared to local computing platforms, cloud-based computing platforms may provide benefits such as improved scalability and resilience. However, cloud-based computing platforms may face technical challenges related to data retrieval relevance and latency.

In the present disclosure, "data retrieval" refers to computing tasks of accessing, extracting, processing, and/or analyzing data stored in the data repositories of the cloud-based computing platform, for example in response to a user query. "Data retrieval relevance" refers to how well retrieved data or generated answers align with the query. "Data retrieval latency" refers to the time taken to retrieve data or generate an answer in response to a query.

One factor that may impact data retrieval relevance is the complexity of processing natural language queries. Many queries can be ambiguous, with words and phrases having different meanings depending on context and intent. For example, an employee user at an India based office searching for leave of absence policy may input "Indian leaves," creating ambiguity as the system may not grasp the semantic intent (i.e., the query could be interpreted as requesting information on departing India based employees, India based leave of absence policies, or India forestry or foliage information). Or a query for "leave of absence policy" may return non-location-specific results if the system is not location-aware.

Another factor that may impact relevance is the multi-turn nature of user queries. For example, a user entity may input "how do I connect to VPN" followed by "I'm on a mac." Many systems may not recognize that the second query supplements the first, and may incorrectly treat them as separate queries.

Data retrieval latency may be impacted by the inherent complexity and scale of cloud-based platforms. For example, computing entities distributed across large geographic areas may have varying response times. Many platforms may process queries serially, waiting for earlier queries to complete before processing later ones.

Various embodiments of the present disclosure may address these technical challenges. For example, some embodiments may implement page-based query answering machine learning models in cloud-based issue and page platforms.

In some embodiments, a page-based query answering machine learning model may include a query variant formulation layer that generates query variant data objects based on query content metadata. The query variant data objects may provide information about the query itself as well as contextual information such as synonyms and location. This may improve data retrieval relevance by considering both the query and its context.

In some embodiments, the model may include a query result formulation layer that retrieves relevant page data objects based on the query variant data objects. This layer may transmit query variant data objects in parallel to a page data object retrieval API, which may help reduce retrieval latency.

In some embodiments, the model may include a query answer formulation layer that generates answer data objects based on the relevant page data objects. This layer may be trained to generate natural language answers in response to queries, including multi-turn queries, which may further improve relevance.

Various embodiments may also provide user interfaces to enhance user experience. For example, some embodiments may render a query input user interface for inputting queries and an answer output user interface for presenting answers. Other user interfaces may also be provided to facilitate data retrieval.

Additional technical details are described further herein.

Definitions

The terms "set," "subset," and similar terms refer to a collection of zero or more elements.

The terms "data," "content," "digital content," "digital content object," "information," and similar terms are used interchangeably to refer to data capable of being transmitted, received, and/or stored in accordance with examples of the present disclosure. Thus, use of any such terms should not be taken to limit the spirit and scope of examples of the present disclosure. Further, where a computing device is described herein to receive data from another computing device, the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, the data may be sent directly to another computing device or may be sent indirectly via one or more intermediary computing devices, such as, for example, one or more servers, relays, routers, network access points, base stations, hosts, and/or the like.

The term "circuitry" should be understood broadly to include hardware and, in some examples, software for configuring the hardware. With respect to components of the apparatus, the term "circuitry" as used herein should therefore be understood to include particular hardware configured to perform the functions associated with the particular circuitry as described herein. For example, "circuitry" may include processing circuitry, storage media, network interfaces, input/output devices, and the like.

The term "client computing device" refers to a computing device that is operated by a user entity to access an example cloud-based issue and page platform in accordance with some implementations of the present disclosure. A user entity may include individual users, organizations, enterprises, and/or other entities. Client computing devices may include desktop computers, workstations, portable digital assistant devices, mobile telephones, smartphones, laptop computers, tablet computers, wearables, or any combination of such devices.

The term "cloud-based issue and page platform" refers to a cloud-based computing platform that comprises or substantively engages with one or more issue data object systems and one or more page data object systems.

The term "page data object system" refers to a cloud-based computing system that allows user entities to collaboratively create, edit and share pages (such as digital documents that may include texts, tables, images, audio data, video data, and/or other content). For example, in a company or organization implementing a cloud-based issue and page platform, the page data object system may store data and/or information associated with the company or organization such as company policies, IT support documents, and/or other organizational content.

An example page data object system of a cloud-based issue and page platform may comprise one or more page data object computing devices and one or more page data object repositories. Confluence® by Atlassian Pty. Ltd. is an example page data object system.

The term "page data object computing device" refers to a data computing device (such as a data processing server) in the example page data object system that performs one or more data processing tasks related to page data objects in the cloud-based issue and page platform.

The term "page data object repository" refers to a data storage device (such as a database) in the example page data object system that stores page data objects. An example page data object repository may provide one or more application programming interfaces (APIs) that facilitate data processing tasks related to page data objects in the page data system.

The terms "page data object retrieval application programming interface" or "page data object retrieval API" refer to a type of application programming interface provided by an example page data object repository that includes one or more standardized sets of protocols and tools that allow computing devices external to the page data object system to interact with the page data object repository and retrieve one or more relevant page data objects from the page data object repository. Additional details associated with example page data object retrieval APIs are provided herein.

The term "issue data object system" refers to a cloud-based computing system that allows user entities to create, track, and assign issues (such as tasks, to-dos, and/or other items). For example, in a company or organization implementing a cloud-based issue and page platform, the issue data object system may store data and/or information associated with the company or organization such as tasks that members of the company or organization are managing or tracking, to-dos related to the members of the company or organization, and/or other organizational items.

An example issue data object system of a cloud-based issue and page platform may comprise one or more issue data object computing devices and one or more issue data object repositories. Jira®, Jira Software®, or Jira Service Management® by Atlassian Pty. Ltd. is an example issue data object system.

The term "issue data object computing device" refers to a data computing device (such as a data processing server) in the example issue data object system that performs one or more data processing tasks related to issue data objects in the cloud-based issue and page platform.

The term "issue data object repository" refers to a data storage device (such as a database) in the example page data object system that stores issue data objects.

The term "data object" refers to structured data that represents, provides, and/or describes information, content, functionalities and/or characteristics associated with information and/or content. The term "metadata" refers to a parameter, a data field, a data element, a data attribute, a data property, and/or other aspects that are part of one or more data objects, requests, responses, and/or other data structures. Example data objects and/or example metadata may be embodied in forms such as binary codes, American Standard Code for Information Interchange (ASCII) codes, memory addresses or pointers to memory addresses in data storage devices, and/or other data formats.

The term "user data object" refers to a type of data object that represents, provides, and/or describes information, content, functionalities and/or characteristics associated with a user entity of the cloud-based issue and page platform. An example user data object may be embodied in forms such as binary codes, ASCII codes, memory addresses or pointers to memory addresses in data storage devices, and/or other data formats.

An example user data object may comprise user metadata such as user identifier metadata, user location metadata, user authority metadata, user role metadata, user organization metadata, and/or other user-related metadata.

The term "user identifier metadata" refers to a type of metadata that uniquely identifies data and/or information associated with a user entity of the cloud-based issue and page platform. For example, example user identifier metadata may identify a user data object associated with the user entity. In a company or organization implementing a cloud-based issue and page platform, example user identifier metadata may comprise data and/or information such as username, user identifier, and/or other user-related information associated with the user.

The term "user location metadata" refers to a type of metadata that comprises, represents, or indicates location information associated with a user entity of the cloud-based issue and page platform. For example, example user location metadata may comprise data and/or information that indicates a work location of a user (for example, work address of the user). Additionally, or alternatively, example user location metadata may comprise data and/or information that indicates a residence location of a user (for example, home address of the user).

Additionally, or alternatively, example user location metadata may comprise data and/or information that indicates a current location of the user (for example, a current location based on GPS information, Wi-Fi positioning information, cellular network triangulation, and/or the like associated with a client computing device of the user). Additionally, or alternatively, example user location metadata may comprise other data and/or information.

The term "user organization metadata" refers to a type of metadata that comprises, represents, or indicates organization information associated with a user. For example, a user may be an employee of a company or organization implementing a cloud-based issue and page platform, and user organization metadata may comprise data and/or information that uniquely identifies the company or organization (for example, a name of the company or organization and/or an identification number of the company or organization).

The term "user authority metadata" refers to a type of metadata that comprises, represents, or indicates data control authority information associated with a user of a company or organization that implements a cloud-based issue and page platform. For example, example user authority metadata may indicate whether a user is an admin user or a non-admin user of an organization. "Administrator user" or "admin user" refer to a user of an organization who has authority to manage, control, or specify data sources based on which a page-based query answering machine learning model generates answer data objects. In contrast, "non-administrator user" or "non-admin user" refer to a user or the organization who does not have the authority to manage, control, or specify data sources based on which a page-based query answering machine learning model generates answer data objects.

The term "user role metadata" refers to a type of metadata that comprises, represents, or indicates role information associated with a user of a company or organization that implements a cloud-based issue and page platform. For example, example user role metadata may comprise, represent, or indicate job title or job description associated with the user (for example, a designer, an engineer, IT support staff, etc.).

While the description above provides example metadata associated with an example user data object, an example user data object may comprise one or more additional and/or alternative metadata types.

As described above, user entities of an example cloud-based issue and page platform may submit queries to the example cloud-based issue and page platform through one or more client computing devices. One or more query data objects may be generated by the one or more client computing devices and/or the example cloud-based issue and page platform based on the user inputs.

The term "query data object" refers to a type of data object that represents, provides, and/or describes data and content related to one or more user queries. An example query data object may be embodied in forms such as binary codes, ASCII codes, memory addresses or pointers to memory addresses in data storage devices, and/or other data formats.

An example query data object may comprise metadata such as query content metadata, user identifier metadata, and/or other metadata types.

The term "query content metadata" refers to a type of metadata of an example query data object that comprises data and/or information related to the content of the query. For example, in a company or organization implementing a cloud-based issue and page platform, example query content metadata may comprise data and/or information indicating user queries such as "what is the leave of absence policy in India?", "how do I connect to VPN?", and/or other organizational queries.

The term "source specification metadata" refers to a type of metadata of an example query data object that comprises data and/or information indicates or identifies one or more data sources based on which a page-based query answering machine learning model generates an answer data object in response to a query data object. For example, example source specification metadata may indicate or identify data object repositories within a cloud-based issue and page platform (such as page data object repositories). Additionally, or alternatively, example source specification metadata may indicate or identify data object repositories external to the cloud-based issue and page platform.

In some embodiments, example user identifier metadata of an example query data object uniquely identifies a user entity of the cloud-based issue and page platform who submitted the query.

While the description above provides example metadata associated with an example query data object, an example query data object may comprise one or more additional and/or alternative metadata types.

The term "issue data object" refers to a type of data object that represents, provides, and/or describes data and content related to one or more tasks, to-dos, and/or other items. An example issue data object may be embodied in forms such as binary codes, ASCII codes, memory addresses or pointers to memory addresses in data storage devices, and/or other data formats.

An example issue data object may comprise metadata such as issue content metadata. The term "issue content metadata" refers to a type of metadata that comprises data and/or information related to the content of an issue. For example, in a company or organization implementing a cloud-based issue and page platform to identify, document, and/or resolve IT related issues, example issue content metadata of an example issue data object may comprise data and/or information indicating a connectivity issue associated with the VPN (for example, tracked by the IT support staff of the company or organization).

The term "page data object" refers to a type of data object that represents, provides, and/or describes data and content related to one or more digital documents that comprise texts, tables, images, audio data, video data, links, interactive data objects (such as plugins and macros) and/or other content. An example page data object may be embodied in forms such as binary codes, ASCII codes, memory addresses or pointers to memory addresses in data storage devices, and/or other data formats. For example, in a company or organization implementing a cloud-based issue and page platform, an example page data object may comprise data and/or information associated with company policies, IT support documents, and/or other organizational content.

An example page data object may comprise metadata such as page content metadata and/or other metadata types. For example, in a company or organization implementing a cloud-based issue and page platform to identify, document, and/or resolve IT related issues, example page content metadata of an example page data object may comprise IT support documentation describing how to connect to the VPN (for example, generated based on inputs from the IT support staff of the company or organization).

The term "answer data object" refers to a type of data object that represents, provides, and/or describes information, content, functionalities and/or characteristics associated with one or more answers to one or more queries. An example answer data object may be embodied in forms such as binary codes, ASCII codes, memory addresses or pointers to memory addresses in data storage devices, and/or other data formats.

An example answer data object may comprise metadata such as answer content metadata, answer source metadata, return question metadata, and/or other metadata types.

The term "answer content metadata" refers to a type of metadata of an example answer data object that comprises data and/or information related to a response to the query. For example, if the query content metadata indicates a user query "how do I connect to VPN?", the answer content metadata of an example answer data object in response to the query data object may provide texts, tables, images, audio data, video data, links, and/or the like that describe detailed steps on how to connect to VPN.

The term "answer source metadata" refers to a type of metadata of an example answer data object that comprises data and/or information indicating one or more data sources (for example, relevant page data objects) based on which the answer content metadata is generated. For example, if the query content metadata indicates a user query "how do I connect to VPN?", the answer source metadata of an example answer data object in response to the query data object may provide one or more hyperlinks to one or more relevant page data objects (based on which the answer content metadata is generated by a page-based query answering machine learning model). In some embodiments, the one or more relevant page data objects are stored in the one or more page data object repositories in the cloud-based issue and page platform. In some embodiments, the answer source metadata may indicate data sources external to the cloud-based issue and page platform.

The term "return question metadata" refers to a type of metadata of an example answer data object that comprises data and/or information related to one or more follow up questions to a user entity that is generated by a page-based query answering machine learning model in response to the user entity's query. For example, if the query content metadata indicates a user query "how do I connect to VPN", the return question metadata of an example answer data object in response to the query data object may comprise one or more follow up questions to the query from the user (such as "what is the operating system of your device?").

While the description above provides example metadata associated with an example answer data object, an example answer data object may comprise one or more additional and/or alternative metadata types.

An example cloud-based issue and page platform may comprise or implement one or more page-based query answering machine learning models to generate one or more answer data objects in response to one or more query data objects.

The term "page-based query answering machine learning model" refers to a machine learning model that is trained to generate answer data objects in response to query content metadata from one or more query data objects.

An example page-based query answering machine learning model may comprise one or more layers. Each layer of the example page-based query answering machine learning model represents a distinct component or module of the structure of the example page-based query answering machine learning model that processes input data and transforms input data to output data for feeding into the next layer or as output from the page-based query answering machine learning model. For example, an example page-based query answering machine learning model may comprise layers such as one or more query variant formulation layers, one or more query result formulation layers, one or more query answer formulation layers, and/or other layer types.

The term "query variant formulation layer" refers to a layer of an example page-based query answering machine learning model that generates query variant data objects based on one or more query data objects and/or query content metadata associated with the one or more query data objects.

The term "query variant data object" refers to a type of data object that comprises metadata that are generated based on (or modified from) query content metadata associated with a query data object. In some embodiments, an example query variant data object comprises data retrieval query. An example query variant data object may be embodied in forms such as binary codes, ASCII codes, memory addresses or pointers to memory addresses in data storage devices, and/or other data formats.

Example query variant data objects may be categorized based on their types. For example, an example query variant formulation layer of an example page-based query answering machine learning model may generate query variant data objects such as keyword-based query variant data objects, synonym-based query variant data objects, location-based query variant data objects, semantics-based query data objects, and/or other types of query variant data objects.

The term "keyword-based query variant data object" refers to a type of query variant data object that comprises keyword metadata that are generated based on one or more keywords in the query content metadata of one or more query data objects. The term "extracted keyword metadata" refers to metadata that comprises one or more keywords generated based on or extracted from the query content metadata of one or more query data objects by an example query variant formulation layer of an example page-based query answering machine learning model.

The term "synonym-based query variant data object" refers to a type of query variant data object that comprises predicted synonym metadata that is generated based on one or more predictions associated with synonyms of one or more keywords in the query content metadata of one or more query data objects. The term "predicted synonym metadata" refers to metadata that comprise one or more synonyms that are predicted based on the query content metadata of one or more query data objects by an example query variant formulation layer of an example page-based query answering machine learning model.

The term "location-based query variant data object" refers to a type of query variant data object comprising predicted location metadata that are generated based on one or more predictions associated with location data of the user entity who submitted one or more queries. The term "predicted location metadata" refers to metadata that comprise location data associated with the user entity who submitted the query as predicted by an example query variant formulation layer of an example page-based query answering machine learning model and based on the query content metadata of one or more query data objects and/or one or more user data objects associated with the one or more query data objects.

The term "semantics-based query variant data object" refers to a type of query variant data object that comprises predicted semantic metadata that are generated based on one or more predictions associated with semantic information of one or more queries. The term "predicted semantics metadata" refers to metadata that comprise semantics that are predicted based on the query content metadata of one or more query data objects by an example query variant formulation layer of an example page-based query answering machine learning model.

While the description above provides example types of query variant data objects, an example query variant formulation layer of an example page-based query answering machine learning model may generate one or more additional and/or alternative types of query variant data objects.

Example query variant data objects may comprise structured data according to one or more page data object retrieval APIs associated with an example cloud-based issue and page platform. For example, various metadata of example query variant data objects may comprise JSON language objects that are formatted according to the one or more page data object retrieval APIs and/or one or more issue data object retrieval APIs. Additional details associated with example query variant data objects are described herein.

An example query variant formulation layer of an example page-based query answering machine learning model may feed one or more query variant data objects into an example query result formulation layer of the example page-based query answering machine learning model. The term "query result formulation layer" refers to a layer of an example page-based query answering machine learning model that transmits one or more query variant data objects to one or more page data object retrieval APIs associated with one or more page data object repositories of an example cloud-based issue and page platform, and receives one or more relevant page data objects from the page data object repositories.

The term "relevant page data object" refers to a type of page data object that represents, provides, and/or describes data and/or information that is relevant to one or more queries associated with one or more query data objects.

One or more page data object computing devices of the example cloud-based issue and page platform may execute one or more data retrieval algorithms based on the query variant data objects to identify one or more relevant page data objects. For example, upon receiving one or more query data objects through a page data object retrieval API, an example page data object computing device may extract the query content metadata from the one or more query data objects and execute one or more searching algorithms based on the query content metadata. The example page data object computing device may compare query content metadata with entries in one or more predetermined indexes of one or more example page data object repositories to identify relevant page data objects. The example page data object computing device may execute one or more scoring algorithms to generate one or more relevance scores to identify one or more page data objects that have relevance scores satisfying one or more predetermined relevance thresholds. The example page data object computing device may determine that one or more page data objects are relevant page data objects associated with the one or more query data objects.

The term "relevant page data object identifying metadata" refers to metadata that represents, provides, and/or describes data and/or information that identifies one or more relevant page data objects from a plurality of page data objects in the example page data object repository. For example, example relevant page data object identifying metadata may be in the form of page data object identifiers that uniquely identify one or more page data objects. Additionally, or alternatively, example relevant page data object identifying metadata may be in other forms that uniquely identify relevant page data objects. Additional details associated with generating the relevant page data object ranking metadata are described herein.

Additionally, or alternatively, the query result formulation layer may transmit one or more query variant data objects to one or more issue data object retrieval APIs associated with one or more issue data object repositories of an example cloud-based issue and page platform, and receives one or more relevant issue data objects from the issue data object repositories.

The term "relevant issue data object" refers to a type of issue data object that represents, provides, and/or describes data and/or information that is relevant to one or more queries associated with one or more query data objects.

One or more issue data object computing devices of the example cloud-based issue and page platform may execute one or more data retrieval algorithms based on the query variant data objects to identify one or more relevant issue data objects. For example, upon receiving one or more query data objects through an issue data object retrieval API, an example issue data object computing device may extract the query content metadata from the one or more query data objects and execute one or more searching algorithms based on the query content metadata. The example issue data object computing device may compare query content metadata with entries in one or more predetermined indexes of one or more example issue data object repositories to identify relevant issue data objects. The example issue data object computing device may execute one or more scoring algorithms to generate one or more relevance scores to identify one or more issue data objects that have relevance scores satisfying one or more predetermined relevance thresholds. The example issue data object computing device may determine that one or more issue data objects are relevant issue data objects associated with the one or more query data objects.

The term "relevant issue data object identifying metadata" refers to metadata that represents, provides, and/or describes data and/or information that identifies one or more relevant issue data objects from a plurality of issue data objects in the example issue data object repository.

For example, example relevant issue data object identifying metadata may be in the form of issue data object identifiers that uniquely identify one or more issue data objects. Additionally, or alternatively, example relevant issue data object identifying metadata may be in other forms that uniquely identify relevant issue data objects.

In some embodiments, an example query result formulation layer of an example page-based query answering machine learning model may feed one or more relevant page data objects (and, optionally, one or more relevant issue data objects) into an example query answer formulation layer of the example page-based query answering machine learning model. In the present disclosure, the term "query answer formulation layer" refers to a layer of an example page-based query answering machine learning model that generates answer data objects based on one or more relevant page data objects.

In some embodiments, example query variant formulation layer(s) and/or example query answer formulation layer(s) of an example page-based query answering machine learning model may comprise one or more generative pre-trained transformers. In the present disclosure, the term "generative pre-trained transformer" refers to a type of machine learning model architecture that is based on the transformer structure and pre-trained on a large corpora of text and/or data. For example, one or more example generative pre-trained transformers may be implemented in the example query variant formulation layer of the example page-based query answering machine learning model to generate one or more query variant data objects based on query content metadata. Additionally, or alternatively, one or more example generative pre-trained transformers may be implemented in the query answer formulation layer of the example page-based query answering machine learning model to generate one or more answer data objects based on the one or more relevant page data objects.

In some embodiments, example query result formulation layer(s) of an example page-based query answering machine learning model may comprise one or more encoders that generate the relevant page data object ranking metadata based on the relevant page data objects. In the present disclosure, the term "encoders" refers to a type of machine learning model architecture that transforms input data into a structured representation while capturing essential and foundational features of the input data.

For example, an example query result formulation layer of an example page-based query answering machine learning model may comprise one or more bi-encoders. In such an example, an example bi-encoder may encode input sequences separately (for example, query content metadata and a relevant page data object) into an example embedding using one or more neural networks. In such an example, the example embedding may indicate a degree of relevance of the relevant page data object to the query content metadata.

Additionally, or alternatively, an example query result formulation layer of an example page-based query answering machine learning model may comprise one or more cross-encoders. In such an example, an example cross-encoder may encode input sequences in series instead of in parallel. In such an example, the example cross-encoder may generate one or more relevance scores associated with one or more relevant page data objects. In some embodiments, the example query result formulation layer of an example page-based query answering machine learning model may generate relevant page data object ranking metadata based on the output from the one or more cross-encoders. Additional details associated with generating relevant page data object ranking metadata are described herein.

As described above, various embodiments of the present disclosure may provide various user interfaces to facilitate data retrieval.

For example, example embodiment of the present disclosure may render example query input user interfaces on one or more computing devices (such as client computing devices). In the present disclosure, the term "query input user interface" refers to a type of user interface that may be rendered in an example cloud-based issue and page platform that enables a user to input one or more queries to the example cloud-based issue and page platform.

Additionally, example embodiment of the present disclosure may render example answer output user interfaces on one or more computing devices (such as client computing devices). In the present disclosure, the term "answer output user interface" refers to a type of user interface that may be rendered in an example cloud-based issue and page platform that presents one or more answers generated by the example cloud-based issue and page platform in response to the one or more queries to the user.

Additional details of various terms in the present application are provided herein.

Example System Architecture for Implementing Embodiments of the Present Disclosure Methods, apparatuses, and computer program products of the present disclosure may be embodied by any of a variety of devices. For example, example methods, apparatuses, and computer program products of example embodiments may be embodied by a networked computing device (for example, a network server in an example cloud-based issue and page platform). Additionally, or alternatively, example methods, apparatuses, and computer program products of example embodiments may be embodied by fixed computing devices, such as a personal computer or a computer workstation. Additionally, or alternatively, example methods, apparatuses, and computer program products of example embodiments may be embodied by any of a variety of mobile devices such as portable digital assistants, mobile telephones, smartphones, laptop computers, tablet computers, wearables, or any combination of the aforementioned devices.

Referring now to FIG. 1, an example system architecture diagram illustrates an example cloud-based computing environment 100 within which embodiments of the present disclosure may operate.

In the example shown in FIG. 1, the cloud-based computing environment 100 may comprise an example cloud-based issue and page platform 103 in electronic communication with one or more client computing devices (such as one or more client computing devices 101) via one or more networks (such as one or more local area networks, one or more wide area networks, and/or the like).

In the example shown in FIG. 1, the one or more client computing devices 101 include, but are not limited to, client computing device 101A, client computing device 101B, client computing device 101C, and client computing device 101D. In some embodiments, the one or more client computing devices 101 may comprise computing devices including desktop computers, laptop computers, smartphones, netbooks, tablet computers, wearables, servers, and the like.

In some embodiments, each of the one or more client computing devices 101 may be operated by a user of the example cloud-based issue and page platform 103. In some embodiments, each of the one or more client computing devices 101 may provide user inputs to the example cloud-based issue and page platform 103 such as one or more query data objects associated with one or more queries from one or more users.

While FIG. 1 illustrates example client computing devices, an example cloud-based issue and page platform may communicate with less than or more than the number of example client computing devices illustrated in FIG. 1, and/or may additionally or alternatively comprise other types of computing devices that operate as client computing devices.

In some embodiments, the one or more client computing devices 101 may communicate with the example cloud-based issue and page platform 103 though one or more data communication networks. Example data communication networks in accordance with some embodiments of the present disclosure may include cable networks, public networks (e.g., the Internet), private networks (e.g., frame-relay networks), wireless networks, cellular networks, telephone networks (e.g., a public switched telephone network), or any other suitable private and/or public networks. Additionally, or alternatively, example data communication networks in accordance with some embodiments of the present disclosure may have any suitable communication range associated therewith and may include, for example, global networks, metropolitan area networks (MANs), wide area networks (WANs), local area networks (LANs), personal area networks (PANs), and/or the like. Additionally, or alternatively, example data communication networks in accordance with some embodiments of the present disclosure may include medium over which network traffic may be carried including coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms/systems provided by network providers or other entities. Additionally, or alternatively, example data communication networks in accordance with some embodiments of the present disclosure may utilize a variety of networking protocols including transmission control protocol/internet protocol (TCP/IP) based networking protocols, custom protocols of JavaScript Object Notation (JSON) objects sent via a WebSocket channel, JSON over remote procedure call (RPC), JSON over representational state transfer/hypertext transfer protocol (REST/HTTP), and/or the like.

In some embodiments, the example cloud-based issue and page platform 103 may comprise an example page data object system 105 and an example issue data object system 111. In some embodiments, each of the example page data object system 105 and the example issue data object system 111 may comprise one or more network computing devices and one or more data storage devices.

In the example shown in FIG. 1, the example page data object system 105 may comprise one or more page data object computing devices 107 (such as page data object computing device 107A, page data object computing device 107B, and/or the like) and one or more page data object repositories 109 (such as page data object repository 109A, page data object repository 109B, and/or the like).

In some embodiments, the one or more page data object computing devices 107 may comprise computing devices including network servers (such as web servers, proxy servers, virtual machines, file transfer protocol (FTP) servers, application servers, file servers, and/or the like), cloud computing networks (including private cloud computing networks, public cloud computing networks, hybrid cloud computing networks, and/or the like), mainframe computers, desktop computers, laptop computers, and/or the like.

In some embodiments, the one or more page data object repositories 109 may include, but are not limited to, page data object repository 109A and page data object repository 109B. In some embodiments, the one or more page data object repositories 109 may comprise data storage devices including network data storages (such as directly attached storage (DAS), network attached storage (NAS), storage area network (SAN), and/or the like), local data storages (such as random access memory (RAM), hard disk drive (HDD), solid-state drive (SSD), and/or the like), removable data storages (such as portable hard drives), database servers, and/or the like.

In some embodiments, the one or more page data object computing devices 107 are in electronic communications with the one or more page data object repositories 109. In some embodiments, the one or more page data object computing devices 107 may generate one or more page data objects, transmit one or more page data objects to the one or more page data object repositories 109 for storage, access one or more page data objects from the one or more page data object repositories 109, modify one or more page data objects, and/or the like.

In the example shown in FIG. 1, the example issue data object system 111 may comprise one or more issue data object computing devices 113 (such as issue data object computing device 113A, issue data object computing device 113B, and/or the like) and one or more issue data object repositories 115 (such as issue data object repository 115A, issue data object repository 115B, and/or the like).

In some embodiments, the one or more issue data object computing devices 113 may comprise computing devices including network servers (such as web servers, proxy servers, virtual machines, FTP servers, application servers, file servers, and/or the like), cloud computing networks (including private cloud computing networks, public cloud computing networks, hybrid cloud computing networks, and/or the like), mainframe computers, desktop computers, laptop computers, and/or the like.

In some embodiments, the one or more issue data object repositories 115 may include, but are not limited to, issue data object repository 115A and issue data object repository 115B. In some embodiments, the one or more issue data object repositories 115 may comprise data storage devices including network data storages (such as DAS, NAS, SAN, and/or the like), local data storages (such as RAM, HDD, SSD, and/or the like), removable data storages (such as portable hard drives), database servers, and/or the like.

In some embodiments, the one or more issue data object computing devices 113 are in electronic communications with the one or more issue data object repositories 115. In some embodiments, the one or more issue data object computing devices 113 may generate one or more issue data objects, transmit one or more issue data objects to the one or more issue data object repositories 115 for storage, access one or more issue data objects from the one or more issue data object repositories 115, modify one or more issue data objects, and/or the like.

It is noted that various components of the example cloud-based issue and page platform 103 may leverage the same computer or computing apparatus to perform various operations. For example, one or more components of one or more network computing devices (such as page data object computing devices 107 and/or issue data object computing devices 113) in the example cloud-based issue and page platform 103 may leverage the same computer or computing apparatus to perform various operations.

Example Apparatuses for Implementing Embodiments of the Present Disclosure

Referring now to FIG. 2, an example block diagram illustrates example components of an example apparatus in accordance with some embodiments of the present disclosure. For example, example client computing devices in various embodiments of the present disclosure (for example, the example client computing devices 101 in FIG. 1) may include one or more computing systems, such as the apparatus 200 shown in FIG. 2.

In some embodiments, the apparatus 200 may be configured to execute at least some of the operations described above with respect to FIG. 1 and below with respect to FIG. 4 to FIG. 13. In some embodiments, the apparatus 200 may include a processor 206, a memory 202, an input/output circuitry 208, a communications circuitry 210, and/or a display 204.

Although the processor 206, the memory 202, the input/output circuitry 208, the communications circuitry 210, and the display 204 may be described with respect to their functions, it should be understood that the particular implementations necessarily include the use of particular hardware. It should also be understood that certain of the processor 206, the memory 202, the input/output circuitry 208, the communications circuitry 210, and/or the display 204 may include similar or common hardware. For example, two sets of circuitries may both leverage use of the same processor, network interface, storage medium, or the like to perform their associated functions, such that duplicate hardware is not required for each set of circuitries.

In some embodiments, the apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries. The use of the term "circuitry" as used herein with respect to components of the apparatus should therefore be understood to include particular hardware configured to perform the functions associated with the particular circuitry as described herein.

In some embodiments, the processor 206 (and/or co-processor or any other processing circuitry assisting or otherwise associated with the processor) may be in communication with the memory 202 via a bus for passing information among components of the apparatus. In some embodiments, the memory 202 is non-transitory and may include, for example, one or more volatile and/or non-volatile memories. In some embodiments, for example, the memory 202 may be an electronic storage device (e.g., a computer readable storage medium). In some embodiments, the memory 202 may be configured to store information, data, content, applications, instructions, or the like, for enabling the apparatus 200 to carry out various functions in accordance with example embodiments of the present disclosure.

In some embodiments, the processor 206 may be embodied in a number of different ways and may, for example, include one or more processing devices configured to perform independently. Additionally, or alternatively, the processor 206 may include one or more processors configured in tandem via a bus to enable independent execution of instructions, pipelining, and/or multithreading. In some embodiments, the use of the term "processing circuitry" may be understood to include a single core processor, a multi-core processor, multiple processors internal to the apparatus, and/or remote or "cloud" processors.

In an example embodiment, the processor 206 may be configured to execute instructions stored in the memory 202 or otherwise accessible to the processor. Alternatively, or additionally, the processor 206 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 206 is embodied as an executor of software instructions, the instructions may specifically configure the processor to perform the algorithms and/or operations described herein when the instructions are executed.

In some embodiments, the apparatus 200 may include the input/output circuitry 208 that may, in turn, be in communication with the processor 206 to provide output to the user and, in some embodiments, to receive an indication of a user input. The input/output circuitry 208 may comprise a user interface circuitry and may include a display, which may comprise a web user interface, a mobile application, a client computing device, a kiosk, or the like. In some embodiments, the input/output circuitry 208 may also include a keyboard, a mouse, a joystick, a touch screen, touch areas, soft keys, a microphone, a speaker, or other input/output mechanisms. In some embodiments, the processor and/or user interface circuitry comprising the processor may be configured to control one or more functions of one or more user interface elements through computer program instructions (e.g., software and/or firmware) stored on a memory accessible to the processor (e.g., the memory 202, and/or the like).

In some embodiments, the apparatus 200 may include the display 204 that may, in turn, be in communication with the processor 206 to display renderings of various user interfaces. In various examples of the present disclosure, the display 204 may include a liquid crystal display (LCD), a light-emitting diode (LED) display, a plasma (PDP) display, a quantum dot (QLED) display, and/or the like.

In some embodiments, the communications circuitry 210 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 210 may include, for example, a network interface for enabling communications with a wired or wireless communication network. For example, the communications circuitry 210 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

Referring now to FIG. 3, an example block diagram illustrates example components of an example apparatus in accordance with some embodiments of the present disclosure. For example, example network computing devices in various embodiments of the present disclosure (for example, the one or more page data object computing devices 107 and/or the one or more issue data object computing devices 113 in FIG. 1) may include one or more computing systems, such as the apparatus 300 shown in FIG. 3.

In some embodiments, the apparatus 300 may be configured to execute at least some of the operations described above with respect to FIG. 1 and below with respect to FIG. 4 to FIG. 13. In some embodiments, the apparatus 300 may include a processor 305, a memory 301, an input/output circuitry 307, and a communications circuitry 303.

Although the processor 305, the memory 301, the input/output circuitry 307, and the communications circuitry 303 may be described with respect to their functions, it should be understood that the particular implementations necessarily include the use of particular hardware. It should also be understood that certain of the processor 305, the memory 301, the input/output circuitry 307, and/or the communications circuitry 303 may include similar or common hardware. For example, two sets of circuitries may both leverage use of the same processor, network interface, storage medium, or the like to perform their associated functions, such that duplicate hardware is not required for each set of circuitries.

In some embodiments, the processor 305 (and/or co-processor or any other processing circuitry assisting or otherwise associated with the processor) may be in communication with the memory 301 via a bus for passing information among components of the apparatus. In some embodiments, the memory 301 is non-transitory and may include, for example, one or more volatile and/or non-volatile memories. In some embodiments, for example, the memory 301 may be an electronic storage device (e.g., a computer-readable storage medium). In some embodiments, the memory 301 may be configured to store information, data, content, applications, instructions, or the like for enabling the apparatus to carry out various functions in accordance with example embodiments of the present disclosure.

In some embodiments, the processor 305 may be embodied in a number of different ways and may, for example, include one or more processing devices configured to perform independently. In some examples, the processor 305 may include one or more processors configured in tandem via a bus to enable independent execution of instructions, pipelining, and/or multithreading. The use of the term "processor" or "processing circuitry" may be understood to include a single core processor, a multi-core processor, multiple processors internal to the apparatus, and/or remote or "cloud" processors.

In some embodiments, the processor 305 may be configured to execute instructions stored in the memory 301 or otherwise accessible to the processor 305. In some examples, the processor 305 may be configured to execute hard-coded functionalities. In some embodiments, whether configured by hardware or software methods, or by a combination thereof, the processor 305 may represent an entity (e.g., physically embodied in circuitry) capable of performing operations according to an embodiment of the present disclosure while configured accordingly. In some embodiments, when the processor 305 is embodied as an executor of software instructions, the instructions may specifically configure the processor 305 to perform the algorithms and/or operations described herein when the instructions are executed.

In some embodiments, the apparatus 300 may optionally include the input/output circuitry 307 that may, in turn, be in communication with the processor 305 to provide output to the user and, in some embodiments, to receive an indication of a user input. In some embodiments, the input/output circuitry 307 may comprise a user interface circuitry and may include a display, which may comprise a web user interface, a mobile application, a client computing device, a kiosk, or the like. In some embodiments, the input/output circuitry 307 may include a keyboard, a mouse, a joystick, a touch screen, touch areas, soft keys, a microphone, a speaker, or other input/output mechanisms. In some embodiments, the processor and/or user interface circuitry comprising the processor may be configured to control one or more functions of one or more user interface elements through computer program instructions (e.g., software and/or firmware) stored on a memory accessible to the processor (e.g., the memory 301, and/or the like).

In some embodiments, the communications circuitry 303 may be any means such as a device or circuitry embodied in either hardware or a combination of hardware and software that is configured to receive and/or transmit data from/to a network and/or any other device, circuitry, or module in communication with the apparatus 300. In some embodiments, the communications circuitry 303 may include, for example, a network interface for enabling communications with a wired or wireless communication network (such as the communication network described above in connection with FIG. 1). In some embodiments, the communications circuitry 303 may include one or more network interface cards, antennae, buses, switches, routers, modems, and supporting hardware and/or software, or any other device suitable for enabling communications via a network. In some embodiments, the communications circuitry 303 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

In some embodiments, other elements of the apparatus 300 may provide or supplement the functionality of particular circuitry. For example, the processor 305 may provide processing functionality, the memory 301 may provide storage functionality, the communications circuitry 303 may provide network interface functionality, and the like. As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

Example Methods for Implementing Embodiments of the Present Disclosure

Various example methods described herein, including, for example, those as shown in FIG. 4 to FIG. 13, may provide various technical advantages and/or improvements described above.

It is noted that each block of the flowchart, and combinations of blocks in the flowchart, may be implemented by various means such as hardware, firmware, circuitry and/or other devices associated with execution of software including one or more computer program instructions. For example, one or more of the methods described in FIG. 4 to FIG. 13 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Example Page-Based Query Answering Machine Learning Model

Referring now to FIG. 4, an example flow diagram illustrating example methods associated with generating and rendering example answer data objects in accordance with some embodiments of the present disclosure is provided.

For example, example methods illustrated in FIG. 4 resolve technical problems associated with data retrieval by utilizing an example page-based query answering machine learning model that comprises an example query variant formulation layer, an example query result formulation layer, and an example query answer formulation layer. In some embodiments, the example query variant formulation layer of the example page-based query answering machine learning model generates query variant data objects to improve data retrieval relevance. In some embodiments, the example query result formulation layer of the example page-based query answering machine learning model transmits query variant data objects in parallel to a page data object retrieval API to reduce data retrieval latency.

In the example shown in FIG. 4, an example method 400 starts at step/operation 402 and then proceeds to step/operation 404. At step/operation 404, in some embodiments, a processing circuitry (such as the processor 305 of the apparatus 300 described in connection with at least FIG. 1 and FIG. 3, and/or the processor 206 of the apparatus 200 described in connection with at least FIG. 1 and FIG. 2) receives query content metadata.

In some embodiments, the processing circuitry may receive query content metadata through a query input user interface of a cloud-based issue and page platform. Referring now to FIG. 5, an example visualization view illustrating an example query input user interface 500 of a cloud-based issue and page platform in accordance with some embodiments of the present disclosure is provided.

In some embodiments, the example query input user interface 500 may be rendered on a computing device (such as client computing devices 101 described above in connection with FIG. 1). In some embodiments, the example query input user interface 500 comprises a text input box user interface element 501 that enables a user entity to provide one or more textual inputs reflecting one or more queries from the user entity. In the example shown in FIG. 5, a user provides a text input "how do I connect to VPN" to the text input box user interface element 501. In such an example, the query content metadata indicates a user query "how do I connect to VPN." As described above, the client computing device may generate a query data object based on the query content metadata and/or transmit the query content metadata (and/or the query data object) to the cloud-based issue and page platform (such as the cloud-based issue and page platform 103 described above in connection with FIG. 1).

Referring back to FIG. 4, subsequent and/or in response to step/operation 404, the example method 400 proceeds to step/operation 406. At step/operation 406, in some embodiments, a processing circuitry (such as the processor 305 of the apparatus 300 described in connection with at least FIG. 1 and FIG. 3, and/or the processor 206 of the apparatus 200 described in connection with at least FIG. 1 and FIG. 2) generates one or more query variant data objects.

In some embodiments, the processing circuitry may generate one or more query variant data objects by inputting the query content metadata to a query variant formulation layer of a page-based query answering machine learning model. Referring now to FIG. 6, an example block diagram 600 illustrating example operations associated with an example page-based query answering machine learning model 602 in accordance with some embodiments of the present disclosure is illustrated.

In the example shown in FIG. 6, the example page-based query answering machine learning model 602 comprises a query variant formulation layer 604. In some embodiments, query content metadata may be received through a query input user interface (for example, the example query input user interface 500 illustrated above in connection with FIG. 5) on the client computing device 101C. In some embodiments, the client computing device 101C generates a query data object that comprises the query content metadata, and transmits the query data object to the query variant formulation layer 604 of the example page-based query answering machine learning model 602.

In some embodiments, the query variant formulation layer 604 of the example page-based query answering machine learning model 602 generates one or more query variant data objects based on the query content metadata. For example, the query variant formulation layer 604 of the example page-based query answering machine learning model 602 may comprise one or more generative pre-trained transformers that are trained to generate one or more query variant data objects based on the query content metadata.

In some embodiments, the query variant formulation layer 604 generates one or more query variant data objects based not only on the query content metadata, but also user metadata associated with a user entity (for example, a user associated with the client computing device 101C). For example, the query data object generated by the client computing device 101C may comprise user identifier metadata that uniquely identifies the user entity. The query variant formulation layer 604 may retrieve a user data object 612 associated with the user entity from an example cloud-based issue and page platform based on the user identifier metadata. The user data object 612 may comprise user metadata such as user location metadata, user authority metadata, user role metadata, and user organization metadata. In some embodiments, the query variant formulation layer 604 may be trained to generate query variant data objects based on the user metadata.

Additional details associated with the query variant formulation layer of the example page-based query answering machine learning model are described herein, including those described in connection with at least FIG. 8 and FIG. 9.

Subsequently, the query variant formulation layer 604 of the page-based query answering machine learning model 602 may transmit the one or more query variant data objects to the query result formulation layer 606 of the example page-based query answering machine learning model 602.

Referring back to FIG. 4, subsequent and/or in response to step/operation 406, the example method 400 proceeds to step/operation 408. At step/operation 408, in some embodiments, a processing circuitry (such as the processor 305 of the apparatus 300 described in connection with at least FIG. 1 and FIG. 3, and/or the processor 206 of the apparatus 200 described in connection with at least FIG. 1 and FIG. 2) retrieves one or more relevant page data objects.

In some embodiments, the processing circuitry retrieves one or more relevant page data objects from a plurality of page data objects by inputting the one or more query variant data objects to a query result formulation layer of the page-based query answering machine learning model.

For example, referring now to FIG. 6, the example page-based query answering machine learning model 602 comprises a query result formulation layer 606. In some embodiments, one or more query variant data objects that are generated by the query variant formulation layer 604 of the page-based query answering machine learning model 602 may be inputted to the query result formulation layer 606. In the example shown in FIG. 6, the query result formulation layer 606 of the page-based query answering machine learning model 602 may transmit the one or more query variant data objects to a page data object retrieval API 610, and may receive relevant page data object identifying metadata that are associated with one or more relevant page data objects from the page data object retrieval API 610. Continuing in this example, the query result formulation layer 606 of the page-based query answering machine learning model 602 may transmit the relevant page data object identifying metadata to the page data object repository 109A, and may retrieve one or more relevant page data objects from the page data object repository 109A.

In some embodiments, the query result formulation layer 606 may retrieve data objects that are stored external to the cloud-based issue and page platform in addition to or in alternative of data objects stored internally in the cloud-based issue and page platform. For example, the query data object generated by the client computing device 101C may comprise source specification metadata that identifies data object repositories external to the cloud-based issue and page platform. In this example, the query result formulation layer 606 may extract user identifier metadata from the user data object 612 and determine whether the user authority metadata of the user data object 612 indicates that the user entity who submitted the query is an admin user. If the query result formulation layer 606 determines that the user is an admin user, the query result formulation layer 606 may transmit data retrieval queries to external data object repositories that are structured in accordance with APIs associated with the external data object repositories. If the query result formulation layer 606 determines that the user is not an admin user, the query result formulation layer 606 may restrict data retrieval to only data object repositories within the example cloud-based issue and page platform.

Additional details associated with the query result formulation layer of the example page-based query answering machine learning model are described herein, including those described in connection with at least FIG. 10 and FIG. 11.

Subsequently, the query result formulation layer 606 of the page-based query answering machine learning model 602 may transmit the one or more relevant page data objects to the query answer formulation layer 608 of the example page-based query answering machine learning model 602.

Referring back to FIG. 4, subsequent and/or in response to step/operation 408, the example method 400 proceeds to step/operation 410. At step/operation 410, in some embodiments, a processing circuitry (such as the processor 305 of the apparatus 300 described in connection with at least FIG. 1 and FIG. 3, and/or the processor 206 of the apparatus 200 described in connection with at least FIG. 1 and FIG. 2) generates one or more answer data objects.

In some embodiments, the processing circuitry generates one or more answer data objects by inputting the one or more relevant page data objects to a query answer formulation layer of the page-based query answering machine learning model.

For example, referring now to FIG. 6, the example page-based query answering machine learning model 602 comprises a query answer formulation layer 608. In some embodiments, relevant page data objects may be inputted to the query answer formulation layer 608 of the example page-based query answering machine learning model 602 from the query result formulation layer 606.

In some embodiments, the query answer formulation layer 608 of the example page-based query answering machine learning model 602 generates one or more answer data objects based on the relevant page data objects. For example, the query answer formulation layer 608 of the example page-based query answering machine learning model 602 may comprise one or more generative pre-trained transformers that are trained to generate one or more answer data objects based on relevant page data objects.

Additional details associated with the query answer formulation layer of the example page-based query answering machine learning model are described herein, including those described in connection with at least FIG. 12 and FIG. 13.

Referring back to FIG. 4, subsequent and/or in response to step/operation 410, the example method 400 proceeds to step/operation 412. At step/operation 412, in some embodiments, a processing circuitry (such as the processor 305 of the apparatus 300 described in connection with at least FIG. 1 and FIG. 3, and/or the processor 206 of the apparatus 200 described in connection with at least FIG. 1 and FIG. 2) renders the one or more answer data objects.

In some embodiments, the processing circuitry renders the one or more answer data objects on an answer output user interface of the cloud-based issue and page platform. Referring now to FIG. 7, an example visualization view illustrating an example answer output user interface 700 of a cloud-based issue and page platform in accordance with some embodiments of the present disclosure is provided.

In the example shown in FIG. 7, the example answer output user interface 700 comprises one or more user interface elements that are rendered based on various metadata associated with an example answer data object that is generated by a page-based query answering machine learning model.

For example, the example answer output user interface 700 may comprise an answer content user interface element 701 that is generated based on the answer content metadata associated with the answer data object. In the example shown in FIG. 7, the answer content user interface element 701 provides detailed steps on how to connect to VPN in response to the user query "how do I connect to VPN?".

Additionally, or alternatively, the example answer output user interface 700 may comprise an answer source user interface element 703 that is generated based on the answer source metadata associated with the answer data object. In the example shown in FIG. 7, the answer source user interface element 703 provides hyperlinks to page data objects stored in one or more page data object repositories that describe how to connect to VPN.

Additionally, or alternatively, the example answer output user interface 700 may comprise a return question user interface element 705 that is generated based on the return question metadata associated with the answer data object. In the example shown in FIG. 7, the return question user interface element 705 provides a follow-up question ("what is the operating system of your device?") in response to the query ("how do I connect to VPN") as the operating system can affect the way to connect VPN.

Additionally, or alternatively, an example answer output user interface in accordance with some embodiments of the present disclosure may comprise one or more other user interface elements.

Referring back to FIG. 4, subsequent and/or in response to step/operation 412, the example method 400 proceeds to step/operation 414 and ends.

Example Query Variant Formulation Layer

Referring now to FIG. 8, an example sequence diagram illustrating example operations associated with an example query variant formulation layer 806 of an example page-based query answering machine learning model in accordance with some embodiments of the present disclosure is illustrated. In particular, FIG. 8 illustrates example data interactions between the example query variant formulation layer 806, one or more software modules of an example cloud-based issue and page platform 804, and an example client device 802. In some embodiments, the query variant formulation layer 806 comprises one or more generative pre-trained transformers 816.

In some embodiments, at data interaction 818, the client device 802 sends a message to the assistance service module 808 of the example cloud-based issue and page platform 804.

In some embodiments, at data interaction 820, the assistance service module 808 of the example cloud-based issue and page platform 804 fetches conversation data from the conversation store module 810 of the example cloud-based issue and page platform 804. In some embodiments, the conversation data comprise query content metadata.

In some embodiments, at data interaction 822, the assistance service module 808 of the example cloud-based issue and page platform 804 requests user location metadata from the identity service module 812 of the example cloud-based issue and page platform 804. For example, the identity service module 812 may determine the user location metadata based on the user data object associated with a user and/or a client computing device associated with the user.

In some embodiments, at data interaction 824, the assistance service module 808 of the example cloud-based issue and page platform 804 transmits conversation data and user location metadata to a query variation formulation interface 814 of the query variant formulation layer 806.

In some embodiments, at data interaction 826, the query variation formulation interface 814 of the query variant formulation layer 806 transmits conversation data and user location metadata to the one or more generative pre-trained transformers 816 of the query variation formulation interface 814.

As an example, the following JSON string represents example conversation data and user location metadata that are transmitted to the one or more generative pre-trained transformers 816 of the query variation formulation interface 814 based on the user query "how do I connect to VPN?"

"plugin_input": "{\"userIntent\": \"user wants to know about how to connect to VPN\", \"semanticSearchVariant\": \"How do I connect to VPN?\", \"bm25Variant\": \"connect VPN\", \"bm25Variant2\": \"VPN connection steps tutorial troubleshoot\", \"semanticSearchLocationVariant\": \"How do I connect to VPN in Bengaluru?\", \"userCountryLocation\": \"India\"}", In some embodiments, at data interaction 828, the one or more generative pre-trained transformers 816 of the query variation formulation interface 814 generates and transmits one or more keyword-based query variant data objects to the query variation formulation interface 814 of the query variant formulation layer 806. In some embodiments, the at least one keyword-based query variant data object comprises extracted keyword metadata based on the query content metadata.

Continuing from the above example where the query is "how do I connect to VPN?", the following example JSON string represents an example keyword-based query variant data object:

"plugin_input": "{\"userIntent\": \"User wants to know how to connect to a VPN\", \"semanticSearchVariant\": \"How do I connect to a VPN?\", \"bm25Variant\": \"connect VPN\", \"bm25Variant2\": \"connect VPN configuration setup\", \"semanticSearchLocationVariant\": \"How do I connect to a VPN in Bengaluru?\", \"userCountryLocation\": \"India\"}", In some embodiments, at data interaction 830, the one or more generative pre-trained transformers 816 of the query variation formulation interface 814 transmits one or more synonym-based query variant data objects to the query variation formulation interface 814 of the query variant formulation layer 806. In some embodiments, the at least one synonym-based query variant data object comprises predicted synonym metadata based on the query content metadata.

Continuing from the above example where the query is "how do I connect to VPN?", the following example JSON string represents an example synonym-based query variant data object:

"plugin_input": "{\"userIntent\": \"Connecting to VPN\", \"semanticSearchVariant\": \"How do I connect to the VPN?\", \"bm25Variant\": \"VPN connect\", \"bm25Variant2\": \"VPN connection setup\", \"semanticSearchLocationVariant\": \"How do I connect to the VPN in Bengaluru?\", \"userCountryLocation\": \"India\"}", In some embodiments, at data interaction 832, the one or more generative pre-trained transformers 816 of the query variation formulation interface 814 transmits one or more semantic-based query variant data objects to the query variation formulation interface 814 of the query variant formulation layer 806.

Continuing from the above example where the query is "how do I connect to VPN?", the following example JSON string represents an example semantic-based query variant data object:

"plugin_input": "{\"userIntent\": \"Connecting to VPN\", \"semanticSearchVariant\": \"How do I connect to VPN?\", \"bm25Variant\": \"connect VPN\", \"bm25Variant2\": \"connect VPN, establish VPN, VPN setup\", \"semanticSearchLocationVariant\": \"How do I connect to VPN in Bengaluru?\", \"userCountryLocation\": \"India\"}", In some embodiments, at data interaction 834, the one or more generative pre-trained transformers 816 of the query variation formulation interface 814 transmits one or more location-based query variant data objects to the query variation formulation interface 814 of the query variant formulation layer 806. In some embodiments, the at least one location-based query variant data object comprises predicted location metadata based on a user data object associated with the query content metadata and/or a client computing device associated with the user.

Continuing from the above example where the query is "how do I connect to VPN?", the following example JSON string represents an example location-based query variant data object:

"plugin_input": "{\"userIntent\": \"Connecting to VPN\", \"semanticSearchVariant\": \"How do I connect to VPN?\", \"bm25Variant\": \"connect VPN\", \"bm25Variant2\": \"connect VPN, establish VPN, VPN setup\", \"semanticSearchLocationVariant\": \"How do I connect to VPN in Bengaluru?\", \"userCountryLocation\": \"India\"}", Referring now to FIG. 9, an example block diagram illustrating example training of an example query variant formulation layer 923 of an example page-based query answering machine learning model 921 in accordance with some embodiments of the present disclosure is illustrated. In particular, FIG. 9 provides details related to the fine-tuning phase of training the example query variant formulation layer 923 using labeled training dataset 901.

In the example shown in FIG. 9, the labeled training dataset 901 comprises training input data 903 and target output data 905. In some embodiments, the training input data 903 is paired with the target output data 905. In some embodiments, the target output data 905 comprise desired or target output from the example query variant formulation layer 923 based on the training input data 903.

In some embodiments, the training input data 903 comprises historical query content metadata 907. In some embodiments, the historical query content metadata 907 comprises data and/or information of a historical query submitted by a user entity. For example, the historical query content metadata 907 may indicate a user query "how do I connect to VPN?"

Additionally, or alternatively, the training input data 903 comprises historical user metadata 909. For example, the historical user metadata 909 may comprise user metadata associated with the user entity who submitted the historical query as indicated in the historical query content metadata 907. For example, the historical user metadata 909 may comprise historical user location metadata, historical user authority metadata, historical user role metadata, historical user organization metadata associated with the user entity.

Additionally, or alternatively, the training input data 903 comprises historical issue metadata 911. For example, the historical issue metadata 911 may comprise metadata from one or more historical issue data objects associated with the user entity who submitted the historical query as indicated in the historical query content metadata 907. For example, the historical issue metadata 911 may comprise historical issue content metadata from the one or more historical issue data objects associated with the user entity.

In some embodiments, the target output data 905 comprises historical query variant data objects 913. In some embodiments, the historical query variant data objects 913 comprise target or desired query variant data objects based on the training input data 903.

For example, the historical query variant data objects 913 may comprise a historical keyword-based query variant data object 915. In this example, the historical keyword-based query variant data object 915 comprises target or desired keywords based on the training input data 903.

Additionally, or alternatively, the historical query variant data objects 913 may comprise a historical synonym-based query variant data object 917. In this example, the historical keyword-based query variant data object 915 comprises target or desired synonyms based on the training input data 903.

Additionally, or alternatively, the historical query variant data objects 913 may comprise a historical location-based query variant data object 919. In this example, the historical location-based query variant data object 919 comprises target or desired location data based on the training input data 903.

As described above, the example query variant formulation layer 923 may comprise one or more generative pre-trained transformers. In such an example, the one or more generative pre-trained transformers may have undergone a pre-training phase based on a large corpus of unlabeled data. Subsequent to the pre-training phase, the pre-trained transformers may undergo a fine-tuning phase based on a labeled training dataset.

For example, during the fine-tuning phase shown in FIG. 9, the training input data 903 (including the historical query content metadata 907 and optionally the historical user metadata 909 and the historical issue metadata 911) are provided as inputs to the one or more generative pre-trained transformers in the example query variant formulation layer 923. Continuing this example, the example query variant formulation layer 923 generates prediction outputs (for example, keyword-based query variant data objects, synonym-based query variant data objects, location-based query variant data objects, and/or the like) based on the training input data 903. Subsequently, prediction outputs (for example, keyword-based query variant data objects, synonym-based query variant data objects, location-based query variant data objects, and/or the like) are compared with the target output data 905 (for example, the historical query variant data objects 913 including the historical keyword-based query variant data object 915, the historical synonym-based query variant data object 917 and the historical location-based query variant data object 919) through a comparison function 925.

In some embodiments, results from the comparison function 925 are provided as feedback to the example query variant formulation layer 923. In some embodiments, the example query variant formulation layer 923 adjusts one or more trainable parameters associated with the generative pre-trained transformers to reduce or minimize the differences between the prediction outputs and the target output data 905 shown in the results. As such, examples of the present disclosure improve accuracy of query variant data objects generated by the example query variant formulation layer 923 and accuracy of answer data objects generated by the page-based query answering machine learning model 921.

Example Query Result Formulation Layer

Referring now to FIG. 10, an example block diagram illustrating example operations associated with an example query result formulation layer 1004 of an example page-based query answering machine learning model in accordance with some embodiments of the present disclosure is illustrated.

In particular, FIG. 10 illustrates data interactions between the example query result formulation layer 1004 and an example query variant formulation layer 1002 of the example page-based query answering machine learning model, as well as data interactions between the example query result formulation layer 1004 and an example query answer formulation layer 1022 of the example page-based query answering machine learning model. FIG. 10 further illustrates data operations within the example query result formulation layer 1004 of an example page-based query answering machine learning model.

In the example shown in FIG. 10, the query variant formulation layer 1002 transmits one or more query variant data objects to the query result formulation layer 1004.

In some embodiments, upon receiving the query variant data objects, the query result formulation layer 1004 transmits the one or more query variant data objects in parallel to a page data object retrieval API 1008 of the cloud-based issue and page platform at step/operation 1006.

In some embodiments, the query result formulation layer 1004 receives relevant page data object identifying metadata associated with one or more relevant page data objects for the query data object from the page data object retrieval API 1008 at step/operation 1010.

In some embodiments, the query result formulation layer 1004 retrieves one or more relevant page data objects from one or more page data object repositories 109 (such as page data object repository 109A and/or page data object repository 109B) based at least in part on the relevant page data object identifying metadata at step/operation 1012.

In some embodiments, the query result formulation layer 1004 of the page-based query answering machine learning model comprises a plurality of encoders. In some embodiments, the query result formulation layer 1004 generates relevant page data object ranking metadata by inputting the one or more relevant page data objects to the plurality of encoders of the query result formulation layer 1004 at step/operation 1016.

In the example shown in FIG. 10, the query result formulation layer 1004 comprises a bi-encoder 1018 and a cross-encoder 1020. In some embodiments, the query result formulation layer 1004 inputs the one or more relevant page data objects to the bi-encoder 1018 to generate initial page data object ranking metadata. The term "bi-encoder" refers to a type of machine learning architecture that processes and encodes a query data object and relevant page data objects associated with the query data object to generate similarity scores that indicate relevance levels of the relevant page data objects to the query data object. In some embodiments, an example bi-encoder may encode and process the query data object in parallel with the relevant page data objects, providing improvements such as reducing latency in data retrieval and ranking.

In some embodiments, the query result formulation layer 1004 may generate the relevant page data object ranking metadata by using the cross-encoder 1020 to update and refine the initial page data object ranking metadata generated by the bi-encoder 1018. For example, the cross-encoder 1020 may retrieve a top n relevant page data objects according to the initial page data object ranking metadata generated by the bi-encoder 1018. In some embodiments, the cross-encoder 1020 encodes and processes the query data object with each of the top n relevant page data objects individually to generate the relevant page data object ranking metadata with improved accuracy in identifying the page data objects that are most relevant to the query data object.

By combining the bi-encoder 1018 with the cross-encoder 1020, various embodiments of the present disclosure reduce latency in data retrieval while improving accuracy in identifying the most relevant page data objects with regards to the query data object.

In some embodiments, the query result formulation layer 1004 further inputs the relevant page data object ranking metadata and the one or more relevant page data objects to the query answer formulation layer 1022 so that the query answer formulation layer 1022 can generate one or more answer data objects.

Referring now to FIG. 11, an example sequence diagram illustrating example operations associated with an example query result formulation layer of an example page-based query answering machine learning model in accordance with some embodiments of the present disclosure is illustrated. In particular, FIG. 11 illustrates example data interactions between the example query result formulation layer 1103 and one or more software modules of an example cloud-based issue and page platform 1101.

In some embodiments, at data interaction 1119, a query result formulation interface 1113 of the example query result formulation layer 1103 may transmit a search configuration request to the search configuration module 1109 of the example cloud-based issue and page platform 1101.

In some embodiments, at data interaction 1121, the search configuration module 1109 of the example cloud-based issue and page platform 1101 may transmit search configuration metadata to the query result formulation interface 1113 of the example query result formulation layer 1103. In some embodiments, the search configuration metadata comprises relevant page data object identifying metadata.

In some embodiments, at data interaction 1123, the query result formulation interface 1113 of the example query result formulation layer 1103 may transmit a user identification request to the identity service module 1107 of the example cloud-based issue and page platform 1101.

In some embodiments, at data interaction 1125, the identity service module 1107 of the example cloud-based issue and page platform 1101 may transmit user identifier metadata to the query result formulation interface 1113 of the example query result formulation layer 1103. In some embodiments, the user identifier metadata identifies the user entity associated with the query data object.

In some embodiments, at data interaction 1127, the query result formulation interface 1113 of the example query result formulation layer 1103 may initiate parallel data retrievals to the search aggregator module 1111 of the example cloud-based issue and page platform 1101. For example, the example query result formulation layer 1103 may request retrieval of relevant page data objects in parallel. Additionally, or alternatively, the example query result formulation layer 1103 may request retrieval of user data object associated with the user identifier metadata.

In some embodiments, at data interaction 1129, the search aggregator module 1111 of the example cloud-based issue and page platform 1101 may return relevant page data objects (and optionally user data object) to the query result formulation interface 1113 of the example query result formulation layer 1103.

In some embodiments, at data interaction 1131, the query result formulation interface 1113 of the example query result formulation layer 1103 may request the bi-encoder 1115 of the example query result formulation layer 1103 to perform a level one ranking of one or more relevant page data objects to generate initial page data object ranking metadata.

In some embodiments, at data interaction 1133, the bi-encoder 1115 of the example query result formulation layer 1103 may return the initial page data object ranking metadata to the query result formulation interface 1113 of the example query result formulation layer 1103.

In some embodiments, at data interaction 1135, the query result formulation interface 1113 of the example query result formulation layer 1103 may request the cross-encoder 1117 of the example query result formulation layer 1103 to perform a level two ranking of one or more relevant page data objects to generate relevant page data object ranking metadata.

In some embodiments, at data interaction 1137, the cross-encoder 1117 of the example query result formulation layer 1103 may return the relevant page data object ranking metadata to the query result formulation interface 1113 of the example query result formulation layer 1103.

Example Query Answer Formulation Layer

Referring now to FIG. 12, an example sequence diagram illustrating example operations associated with an example query answer formulation layer of an example page-based query answering machine learning model in accordance with some embodiments of the present disclosure is illustrated. In particular, FIG. 12 illustrates example data interactions between the example query answer formulation layer 1206, one or more software modules of an example cloud-based issue and page platform 1204, and an example client device 1202. In some embodiments, the example query answer formulation layer 1206 comprises one or more generative pre-trained transformers 1214.

In some embodiments, at data interaction 1216, the query answer formulation interface 1212 of the example query answer formulation layer 1206 transmits one or more answer formulation request to the one or more generative pre-trained transformers 1214 of the example query answer formulation layer 1206.

In some embodiments, at data interaction 1218, the one or more generative pre-trained transformers 1214 of the example query answer formulation layer 1206 transmit answer content metadata associated with one or more answer data objects to the query answer formulation interface 1212 of the example query answer formulation layer 1206.

In some embodiments, at data interaction 1220, the query answer formulation interface 1212 of the example query answer formulation layer 1206 transmits one or more source identification requests to the search result module 1210 of an example cloud-based issue and page platform 1204.

In some embodiments, at data interaction 1222, the search result module 1210 of an example cloud-based issue and page platform 1204 transmits answer source metadata associated with one or more answer data objects to the query answer formulation interface 1212 of the example query answer formulation layer 1206.

In some embodiments, at data interaction 1224, the query answer formulation interface 1212 of the example query answer formulation layer 1206 transmits one or more question generate request to the one or more generative pre-trained transformers 1214 of the example query answer formulation layer 1206.

In some embodiments, at data interaction 1226, the one or more generative pre-trained transformers 1214 of the example query answer formulation layer 1206 transmit return question metadata associated with one or more answer data objects to the query answer formulation interface 1212 of the example query answer formulation layer 1206.

In some embodiments, at data interaction 1228, the query answer formulation interface 1212 of the example query answer formulation layer 1206 transmits one or more answer data objects to the assistance service module 1208 of the example cloud-based issue and page platform 1204.

In some embodiments, at data interaction 1230, the assistance service module 1208 of the example cloud-based issue and page platform 1204 transmits one or more answer data objects to the client device 1202 so that the one or more answer data objects can be rendered on an answer output user interface of the cloud-based issue and page platform.

Referring now to FIG. 13, an example block diagram illustrating example training of an example query answer formulation layer 1323 of an example page-based query answering machine learning model 1321 in accordance with some embodiments of the present disclosure is illustrated. In particular, FIG. 13 provides details related to the fine-tuning phase of training the example query answer formulation layer 1323 using labeled training dataset 1301.

In the example shown in FIG. 13, the labeled training dataset 1301 comprises training input data 1303 and target output data 1305. In some embodiments, the training input data 1303 is paired with the target output data 1305. In some embodiments, the target output data 1305 comprise desired or target output from the example query answer formulation layer 1323 based on the training input data 1303.

In some embodiments, the training input data 1303 comprises historical relevant page data objects 1307. For example, the historical relevant page data objects 1307 may comprise one or more page data objects that are relevant to a historical query (for example, page data objects describing how to connect to VPN that are relevant to a historical query "how do I connect to VPN?").

Additionally, or alternatively, the training input data 1303 comprises historical relevant page data object ranking metadata 1309. For example, the page data object ranking metadata indicate a ranking of the historical relevant page data objects 1307 based on their relevance to the historical query.

Additionally, or alternatively, the training input data 1303 comprises historical user metadata 1311. For example, the historical user metadata 1311 may comprise user metadata associated with the user entity who submitted the historical query.

In some embodiments, the target output data 1305 comprises a historical answer data object 1313. In some embodiments, the historical answer data objects 1313 comprise data and/or information indicating one or more target or desired answers based on the historical query.

For example, the historical answer data object 1313 may comprise historical answer content metadata 1315. In this example, the historical answer content metadata 1315 may indicate target or desired answer content based on the training input data 1303.

Additionally, or alternatively, the historical answer data object 1313 may comprise historical answer source metadata 1317. In this example, the historical answer source metadata 1317 may indicate target or desired data sources associated with the historical answer content metadata 1315 based on the training input data 1303.

Additionally, or alternatively, the historical answer data object 1313 may comprise historical return question metadata 1319. In this example, the historical return question metadata 1319 may indicate one or more target or desired follow up questions based on the training input data 1303.

As described above, the example query answer formulation layer 1323 may comprise one or more generative pre-trained transformers. In such an example, the one or more generative pre-trained transformers may have undergone a pre-training phase based on a large corpus of unlabeled data. Subsequent to the pre-training phase, the pre-trained transformers may undergo a fine-tuning phase based on a labeled training dataset.

For example, during the fine-tuning phase shown in FIG. 13, the training input data 1303 (including the historical relevant page data objects 1307 and optionally the historical relevant page data object ranking metadata 1309 and/or the historical user metadata 1311) are provided as inputs to the one or more generative pre-trained transformers in the example query answer formulation layer 1323. Continuing this example, the example query answer formulation layer 1323 generates prediction outputs (for example, answer data objects comprising answer content metadata, answer source metadata, return question metadata, and/or the like) based on the training input data 1303. Subsequently, prediction outputs (for example, answer data objects comprising answer content metadata, answer source metadata, return question metadata, and/or the like) are compared with the target output data 1305 (for example, the historical answer data object 1313 comprising the historical answer content metadata 1315, the historical answer source metadata 1317, and/or the historical return question metadata 1319) through a comparison function 1325.

In some embodiments, results from the comparison function 1325 are provided as feedback to the example query answer formulation layer 1323. In some embodiments, the example query answer formulation layer 1323 adjusts one or more trainable parameters associated with the generative pre-trained transformers to reduce or minimize the differences between the prediction outputs and the target output data 1305 shown in the results. As such, examples of the present disclosure improve accuracy of answer data objects generated by the example query answer formulation layer 1323 of the page-based query answering machine learning model 921.

Additional Implementation Details

Although example processing systems have been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. A computer-readable storage medium can be, or be included in, a computer-readable storage device, a computer-readable storage substrate, a random or serial access memory array or device, or a combination of one or more of them. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a data object repository management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., an LCD monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML (Hypertext Markup Language) page) to a client computing device (e.g., for purposes of displaying information/data to and receiving user input from a user interacting with the client computing device). Information/data generated at the client computing device (e.g., a result of the user interaction) can be received from the client computing device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus comprising at least one processor and at least one non-transitory memory comprising program code, the at least one non-transitory memory and the program code configured to, with the at least one processor, cause the apparatus to at least:

receive query content metadata via a user interface of a cloud-based issue and page platform;

retrieve, based on user identifier metadata associated with the query content metadata, a user data object corresponding to a user;

determine user authority metadata from the user data object, the user authority metadata indicating whether the user is an administrator;

generate one or more query variant data objects using a query variant formulation layer;

select one or more data object repositories based on the user authority metadata, wherein:

when the user authority metadata indicates that the user is the administrator, the one or more selected data object repositories include one or more external data object repositories, and when the user authority metadata indicates that the user is not the administrator, the one or more selected data object repositories are restricted to data object repositories within the cloud-based issue and page platform;

transmit one or more retrieval queries corresponding to the one or more query variant data objects to only the one or more selected data object repositories;

receive identifying metadata for one or more page data objects from the one or more selected data object repositories;

retrieve one or more page data objects based on the identifying metadata;

generate one or more answer data objects based on the one or more retrieved page data objects using a query answer formulation layer; and render the one or more answer data objects via the user interface.

2. The apparatus of claim 1, wherein the query variant formulation layer and the query answer formulation layer comprise one or more generative pre-trained transformers.

3. The apparatus of claim 1, wherein the one or more query variant data objects comprise at least one keyword-based query variant data object, wherein the at least one keyword-based query variant data object comprises extracted keyword metadata based on the query content metadata.

4. The apparatus of claim 1, wherein the one or more query variant data objects comprise at least one synonym-based query variant data object, wherein the at least one synonym-based query variant data object comprises predicted synonym metadata based on the query content metadata.

5. The apparatus of claim 1, wherein the one or more query variant data objects comprise at least one location-based query variant data object, wherein the at least one location-based query variant data object comprises predicted location metadata based on the user data object associated with the query content metadata.

6. The apparatus of claim 1, wherein the at least one non-transitory memory and the program code are configured to, with the at least one processor, cause the apparatus to:

transmit the one or more query variant data objects in parallel to a page data object retrieval application programming interface (API); and receive the identifying metadata associated with the one or more page data objects from the page data object retrieval API.

7. The apparatus of claim 1, wherein the at least one non-transitory memory and the program code are configured to, with the at least one processor, cause the apparatus to:

generate relevant page data object ranking metadata by inputting the one or more retrieved page data objects to a plurality of encoders of a query result formulation layer; and generate the one or more answer data objects by inputting the relevant page data object ranking metadata and the one or more retrieved page data objects to the query answer formulation layer.

8. A computer-implemented method comprising:

receiving query content metadata via a user interface of a cloud-based issue and page platform;

retrieving, based on user identifier metadata associated with the query content metadata, a user data object corresponding to a user;

determining user authority metadata from the user data object, the user authority metadata indicating whether the user is an administrator;

generating one or more query variant data objects using a query variant formulation layer;

selecting one or more data object repositories based on the user authority metadata, wherein, in response to determining that the user authority metadata indicates that the user is not the administrator, the one or more selected data object repositories are restricted to data object repositories within the cloud-based issue and page platform;

transmitting one or more retrieval queries corresponding to the one or more query variant data objects to only the one or more selected data object repositories;

receiving identifying metadata for one or more page data objects from the one or more selected data object repositories;

retrieving one or more page data objects based on the identifying metadata;

generating one or more answer data objects based on the one or more retrieved page data objects using a query answer formulation layer; and rendering the one or more answer data objects via the user interface.

9. The computer-implemented method of claim 8, wherein the query variant formulation layer and the query answer formulation layer comprise one or more generative pre-trained transformers.

10. The computer-implemented method of claim 8, wherein the one or more query variant data objects comprise at least one keyword-based query variant data object, wherein the at least one keyword-based query variant data object comprises extracted keyword metadata based on the query content metadata.

11. The computer-implemented method of claim 8, wherein the one or more query variant data objects comprise at least one synonym-based query variant data object, wherein the at least one synonym-based query variant data object comprises predicted synonym metadata based on the query content metadata.

12. The computer-implemented method of claim 8, wherein the one or more query variant data objects comprise at least one location-based query variant data object, wherein the at least one location-based query variant data object comprises predicted location metadata based on the user data object associated with the query content metadata.

13. The computer-implemented method of claim 8, wherein the computer-implemented method comprises:

transmitting the one or more query variant data objects in parallel to a page data object retrieval application programming interface (API) of the cloud-based issue and page platform; and receiving the identifying metadata associated with the one or more retrieved page data objects from the page data object retrieval API.

14. The computer-implemented method of claim 8, further comprising:

generating relevant page data object ranking metadata by inputting the one or more retrieved page data objects to a plurality of encoders of a query result formulation layer; and generating the one or more answer data objects by inputting the relevant page data object ranking metadata and the one or more retrieved page data objects to the query answer formulation layer.

15. A computer program product comprising at least one non-transitory computer-readable storage medium having computer-readable program code portions stored therein, the computer-readable program code portions comprising an executable portion configured to:

receive query content metadata via a user interface of a cloud-based issue and page platform;

retrieve, based on user identifier metadata associated with the query content metadata, a user data object corresponding to a user;

determine user authority metadata from the user data object, the user authority metadata indicating whether the user is an administrator;

generate one or more query variant data objects using a query variant formulation layer;

select one or more data object repositories based on the user authority metadata, wherein:

when the user authority metadata indicates that the user is the administrator, the one or more selected data object repositories include one or more external data object repositories, and when the user authority metadata indicates that the user is not the administrator, the one or more selected data object repositories are restricted to data object repositories within the cloud-based issue and page platform;

transmit one or more retrieval queries corresponding to the one or more query variant data objects to only the one or more selected data object repositories;

receive identifying metadata for one or more page data objects from the one or more selected data object repositories;

retrieve one or more page data objects based on the identifying metadata;

generate one or more answer data objects based on the one or more retrieved page data objects using a query answer formulation layer; and render the one or more answer data objects via the user interface.

16. The computer program product of claim 15, wherein the query variant formulation layer and the query answer formulation layer comprise one or more generative pre-trained transformers.

17. The computer program product of claim 15, wherein the one or more query variant data objects comprise at least one keyword-based query variant data object, wherein the at least one keyword-based query variant data object comprises extracted keyword metadata based on the query content metadata.

* * * * *